(12) United States Patent
Narinen et al.

(10) Patent No.: US 11,981,242 B2
(45) Date of Patent: May 14, 2024

(54) PALLET, A TRANSPORT DEVICE, AND SYSTEM FOR TRANSPORTING GOODS

(71) Applicant: VERICREA, Sastamala (FI)

(72) Inventors: Seppo Narinen, Sastamala (FI); Antti Luomala, Sastamala (FI)

(73) Assignee: VERICREA, Sastamala (FI)

( * ) Notice: Subject to any disclaimer, the term of this patent is extended or adjusted under 35 U.S.C. 154(b) by 225 days.

(21) Appl. No.: 17/771,156

(22) PCT Filed: Oct. 20, 2020

(86) PCT No.: PCT/FI2020/050685
§ 371 (c)(1),
(2) Date: Apr. 22, 2022

(87) PCT Pub. No.: WO2021/079024
PCT Pub. Date: Apr. 29, 2021

(65) Prior Publication Data
US 2022/0363182 A1 Nov. 17, 2022

(30) Foreign Application Priority Data
Oct. 23, 2019 (FI) .................................. 20195910

(51) Int. Cl.
*B60P 1/32* (2006.01)
*B60P 1/64* (2006.01)
(Continued)

(52) U.S. Cl.
CPC .............. *B60P 1/32* (2013.01); *B60P 1/6454* (2013.01); *B62B 5/0404* (2013.01);
(Continued)

(58) Field of Classification Search
CPC .................................. B60P 1/32; B60P 1/6454
See application file for complete search history.

(56) References Cited

U.S. PATENT DOCUMENTS

| | | | |
|---|---|---|---|
| 1,870,573 A | 8/1932 | Joseph | |
| 4,741,575 A * | 5/1988 | Sloan | B60P 1/32 414/522 |

(Continued)

FOREIGN PATENT DOCUMENTS

| | | |
|---|---|---|
| CH | 351506 A | 1/1961 |
| DE | 19643545 A1 | 5/1998 |

(Continued)

OTHER PUBLICATIONS

Finnish Patent and Registration Office, Office Action, U.S. Appl. No. 20/195,910, dated May 22, 2020, 9 pages.

(Continued)

*Primary Examiner* — Jonathan Snelting
(74) *Attorney, Agent, or Firm* — Ziegler IP Law Group

(57) ABSTRACT

A pallet and a transport device for the pallet. The pallet, includes a frame having side parts and a rod that extends between the side parts. A span of the rod is at least half of the length of the rod. The pallet includes foot arrangements having parts configured to guide the pallet onto a bed of the transport device. The transport device includes the bed, a chassis and articulations enabling rotation of the bed relative to the chassis. The bed includes side beams that are configured to engage with the parts of the foot arrangements thereby guiding the pallet onto the bed. A system includes the pallet and the transport device.

16 Claims, 18 Drawing Sheets

(51) Int. Cl.
*B62B 5/04* (2006.01)
*B65D 19/00* (2006.01)
*B65D 19/42* (2006.01)

(52) U.S. Cl.
CPC ......... *B65D 19/0002* (2013.01); *B65D 19/42* (2013.01); *B65D 2519/00024* (2013.01); *B65D 2519/00273* (2013.01); *B65D 2519/00293* (2013.01); *B65D 2519/00298* (2013.01); *B65D 2519/00323* (2013.01); *B65D 2519/00781* (2013.01)

(56) References Cited

U.S. PATENT DOCUMENTS

| | | |
|---|---|---|
| 4,930,799 A | 6/1990 | Pihlstrom et al. |
| 5,000,645 A | 3/1991 | Polojarvi |
| 8,459,925 B2 * | 6/2013 | Mullin .................. B60P 1/32 414/346 |
| 9,731,642 B2 * | 8/2017 | Narinen .................. B60P 3/122 |
| 2017/0036588 A1 | 2/2017 | Gil |

FOREIGN PATENT DOCUMENTS

| | | |
|---|---|---|
| FI | 124305 B | 6/2014 |
| JP | 85285231 U | 6/1977 |
| WO | 2013178883 A1 | 12/2013 |

OTHER PUBLICATIONS

International Search Report, Finnish Patent and Registration Office, Application No. PCT/FI2020/050685, dated Dec. 18, 2020, 4 pages.
Written Opinion of the International Searching Authority, Finnish Patent and Registration Office, Application No. PCT/FI2020/050685, dated Dec. 18, 2020, 7 pages.

* cited by examiner

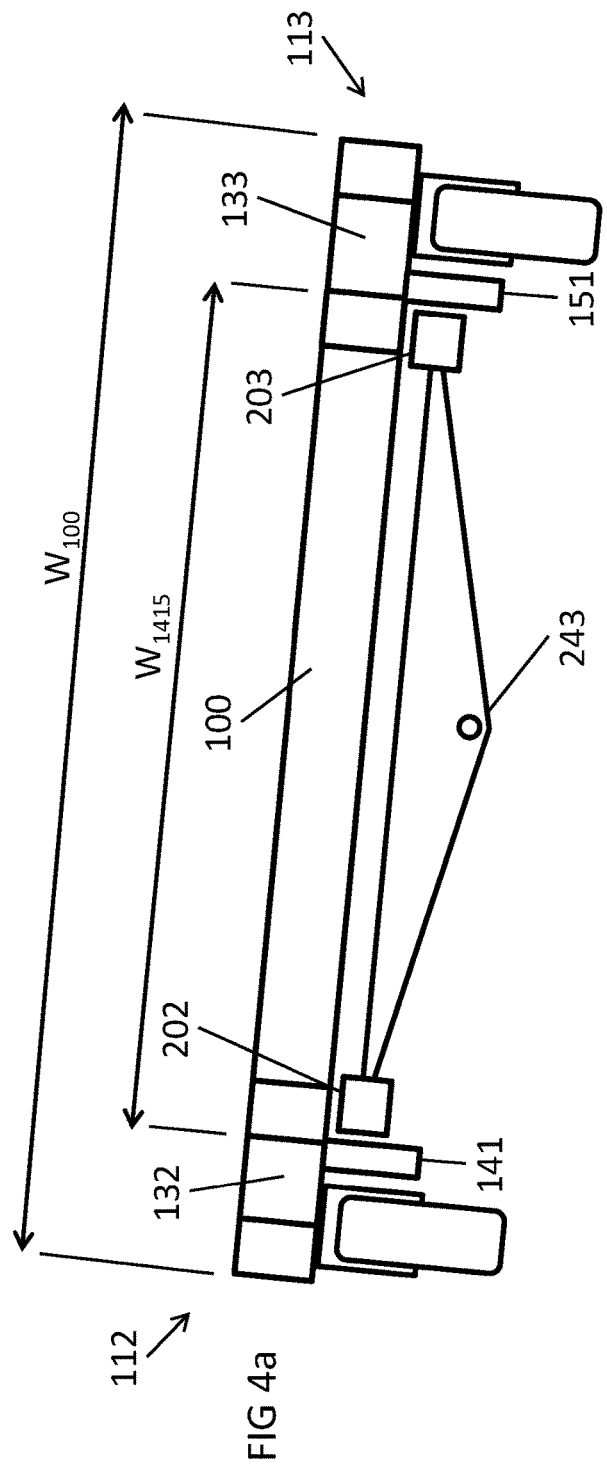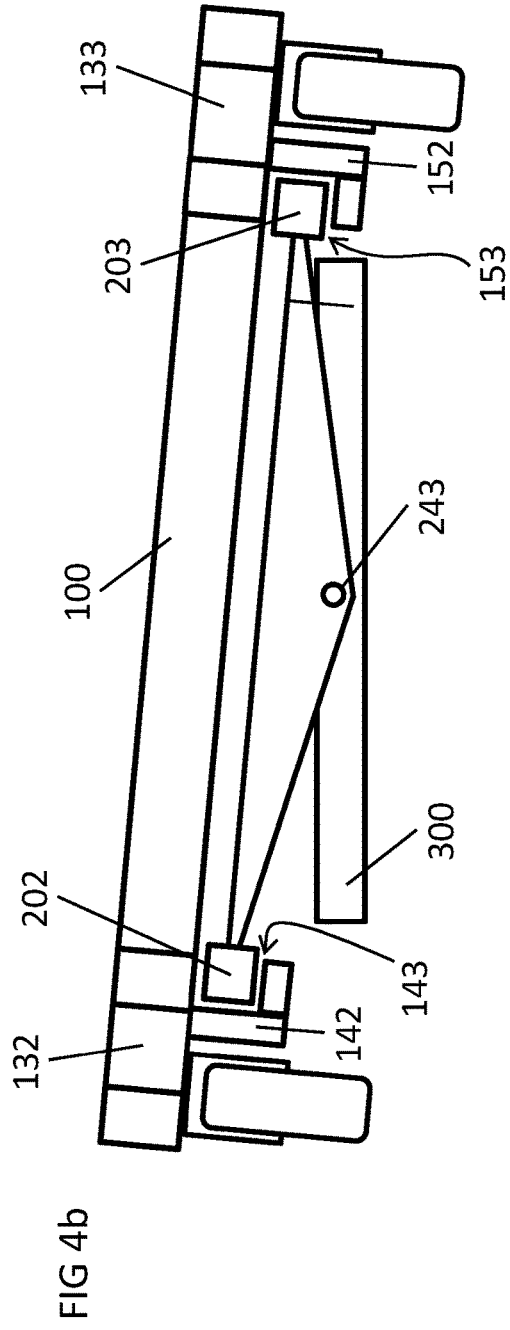

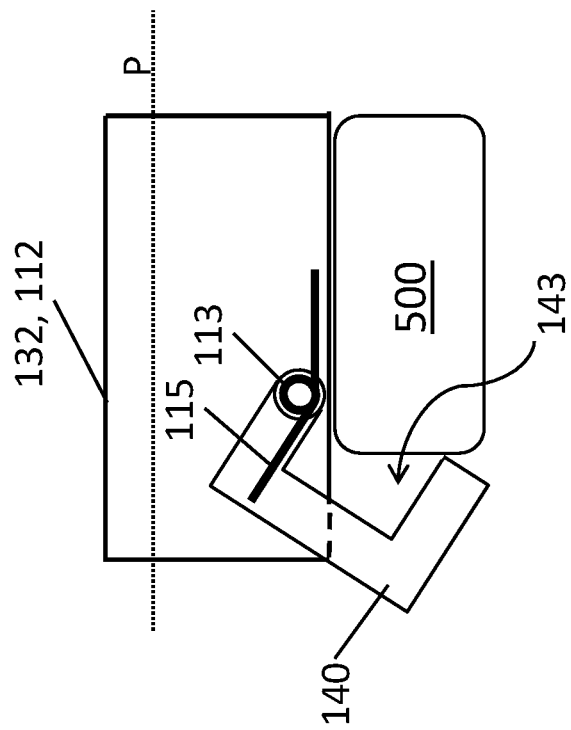
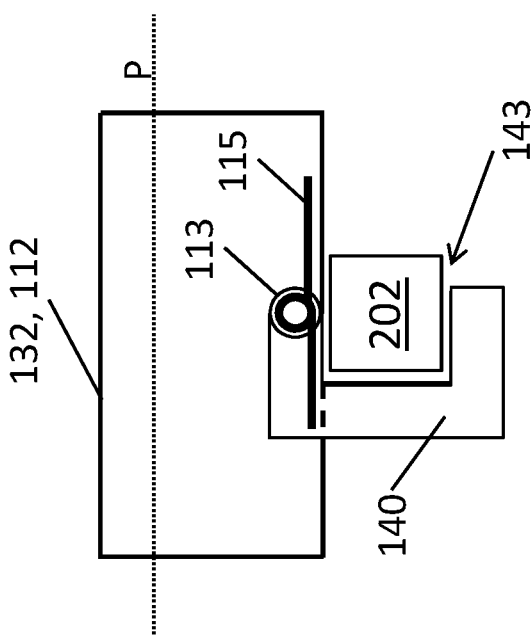

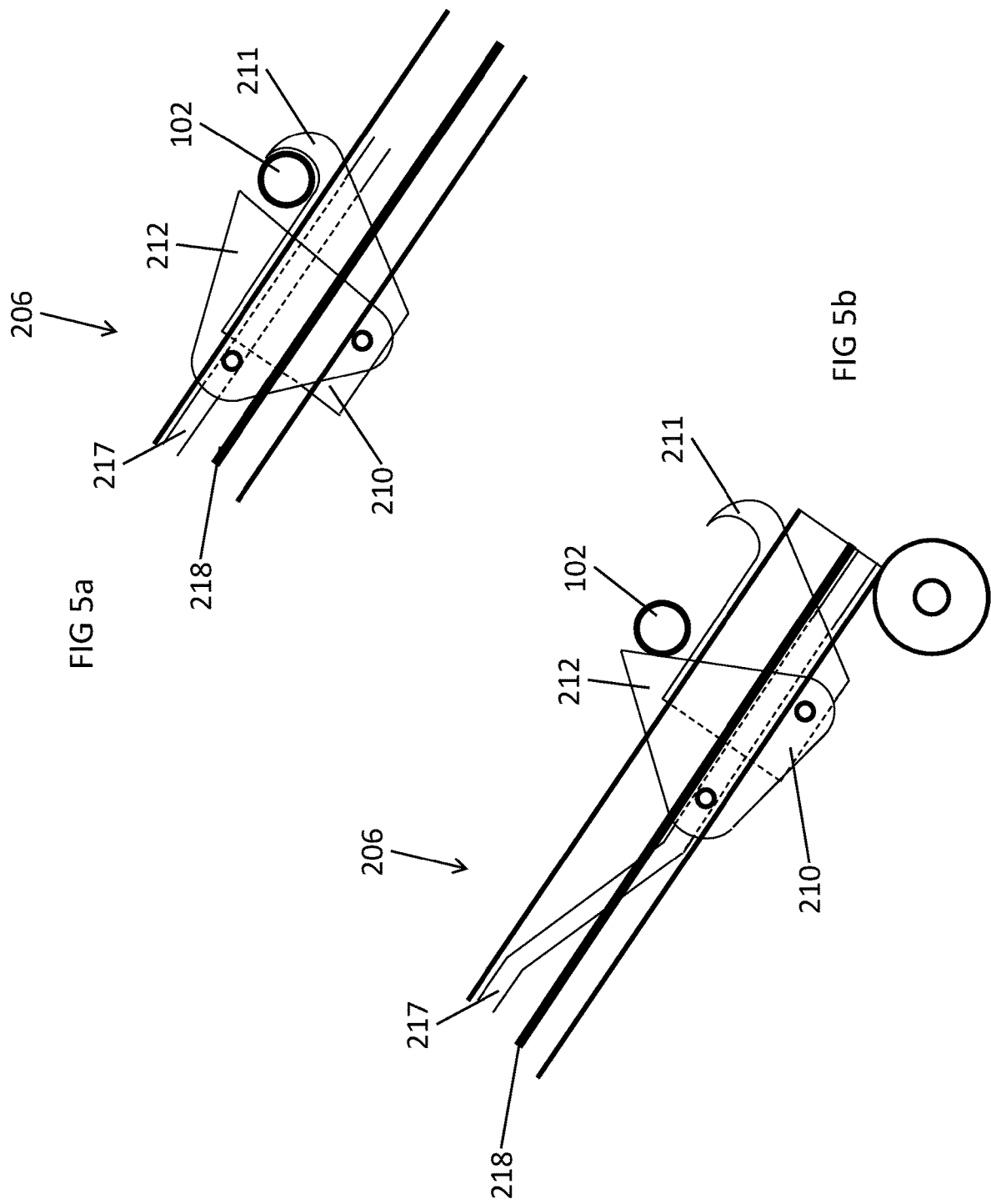

PALLET, A TRANSPORT DEVICE, AND SYSTEM FOR TRANSPORTING GOODS

TECHNICAL FIELD

The invention is related to transport devices. The invention is related to pallets. The invention is related to transport systems with transport devices and pallets.

BACKGROUND

Internet based stores have increased the number of small-scale shipments. In highly populated areas, light transport devices, such a bicycles, trolleys, scooters, or passenger cars are used for shipments. This may be done at least for two reasons. First, less space is required for light vehicles than for large vehicles. Second, some cities have regulations regulating use of combustion engine based vehicles in central areas of the cities. Moreover, the last metres of the transport (i.e. last mile transport) may be sometimes done manually, i.e. without a transport device. In order to transport goods, the goods may be arranged on a pallet. However, manually transferable pallets that are simultaneously usable as part of a transport system, i.e. in combination with a light transport device, are rare.

Moreover, autonomous transport and/or autonomous loading or unloading requires robust solutions. An example of an interchangeable platform and a trailer has been presented in the publication WO 2013/178883. However, that solution requires manual operation, e.g. manually fixing a rope (or a corresponding fastening apparatus) of a transport device to the interchangeable platform. Moreover, in that solution, if a distance between the transport device and the interchangeable platform is very short, the interchangeable platform does not necessarily have enough space for turning towards the transport device in order to be properly loaded. However, autonomous loading devices require reliable operation also in such cases, wherein a distance between the transport device and the pallet is short.

SUMMARY

To address the problem of autonomous transport and also loading/unloading pallets at short distances, the following are presented: a pallet (e.g. in examples 101 to 120), a transport device (e.g. in examples 201 to 223), and a system for transporting good, the system comprising the pallet and the transport device (e.g. in examples 301 to 309). The pallet 100, comprises a frame 110 having a side parts 112, 113 and a rod 102 that extends between the side parts 112, 113. A span of the rod 102 is at least half of the length $L_{102}$ of the rod 102. The pallet comprises foot arrangements 140, 150 having parts 141, 141, 151, 152 configured to guide the pallet 100 onto a bed 200 of the transport device 400. The transport device 400 comprises the bed 200, a chassis 300 and articulations 241, 242 enabling rotation of the bed 200 relative to the chassis 300. The bed 200 comprises side beams 202, 203 that are configured to engage with the parts 141, 141, 151, 152 of the foot arrangements 140, 150 thereby guiding the pallet 100 onto the bed 200. The system comprises the pallet 100 and the transport device 400.

The transport device allows for autonomous loading because it comprises side beams that taper toward a rear end of a bed of the transport device. The pallet comprises corresponding side profiles that engage with the tapering part of the side beams of the bed, whereby the pallet automatically rotates to a proper orientation while loading.

Moreover, the transport device comprises a first articulation and a second articulation that allow for the bed to turn to a proper orientation relative to the pallet.

Furthermore, the front parts of the side beams of the bed a parallel. These front parts are configured to engage with a primary foot arrangement and a secondary foot arrangement of the pallet so that the directions of lengths of the pallet and the bed become the same during loading.

Other features of the pallet and the transport device are detailed below.

BRIEF DESCRIPTION OF THE DRAWINGS

FIGS. 4a and 4b show, in an end view, a part of a transport device loaded with a pallet,
FIGS. 4c and 4d show, in a detailed end view, a part of a transport device loaded with a pallet
FIGS. 5a and 5b show a detailed part of a loading and unloading arrangement of a transport device.

DETAILED DESCRIPTION

Figure 1A:
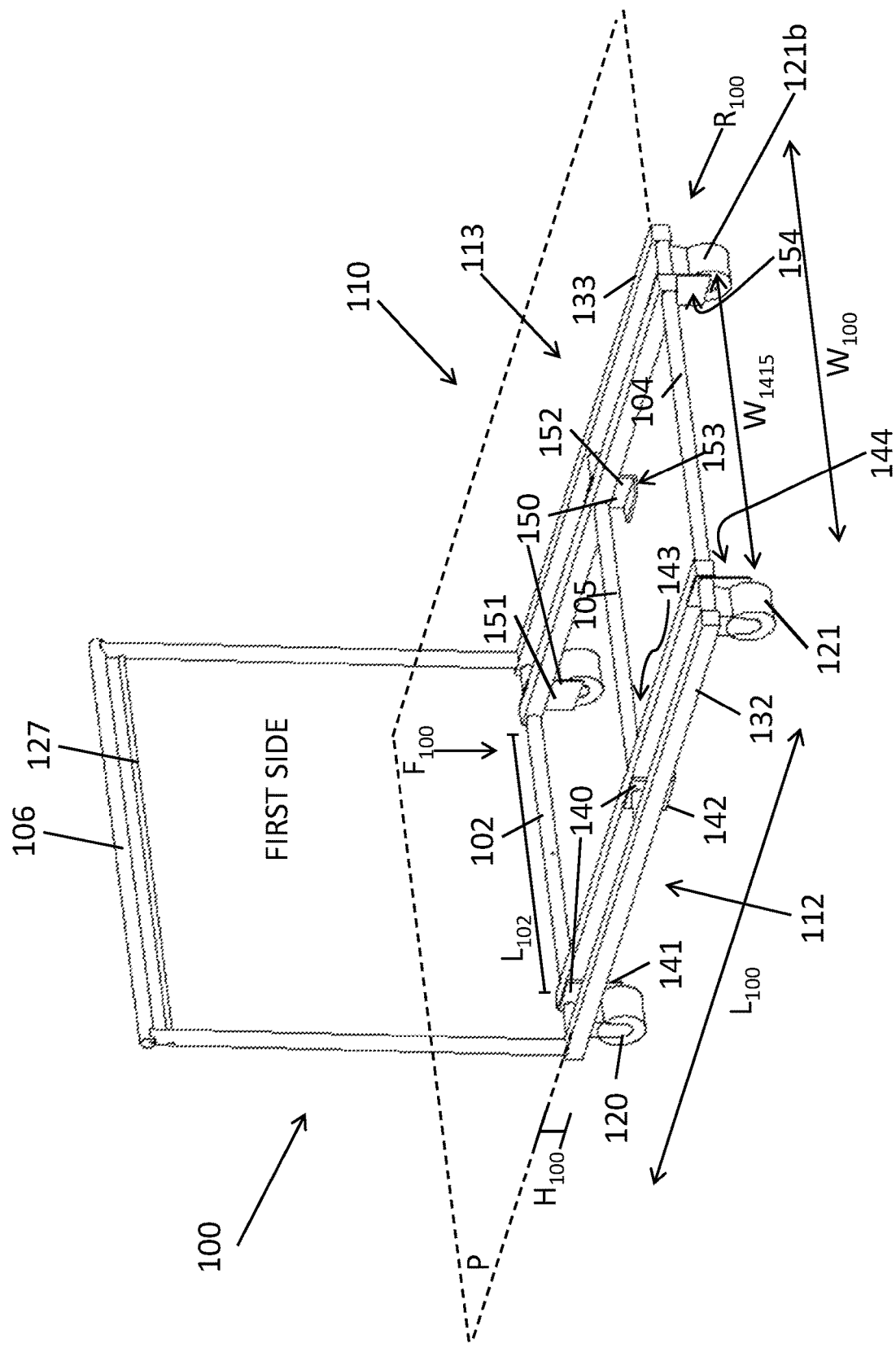
FIG. 1a shows an embodiment of a pallet.
Figure 1B:
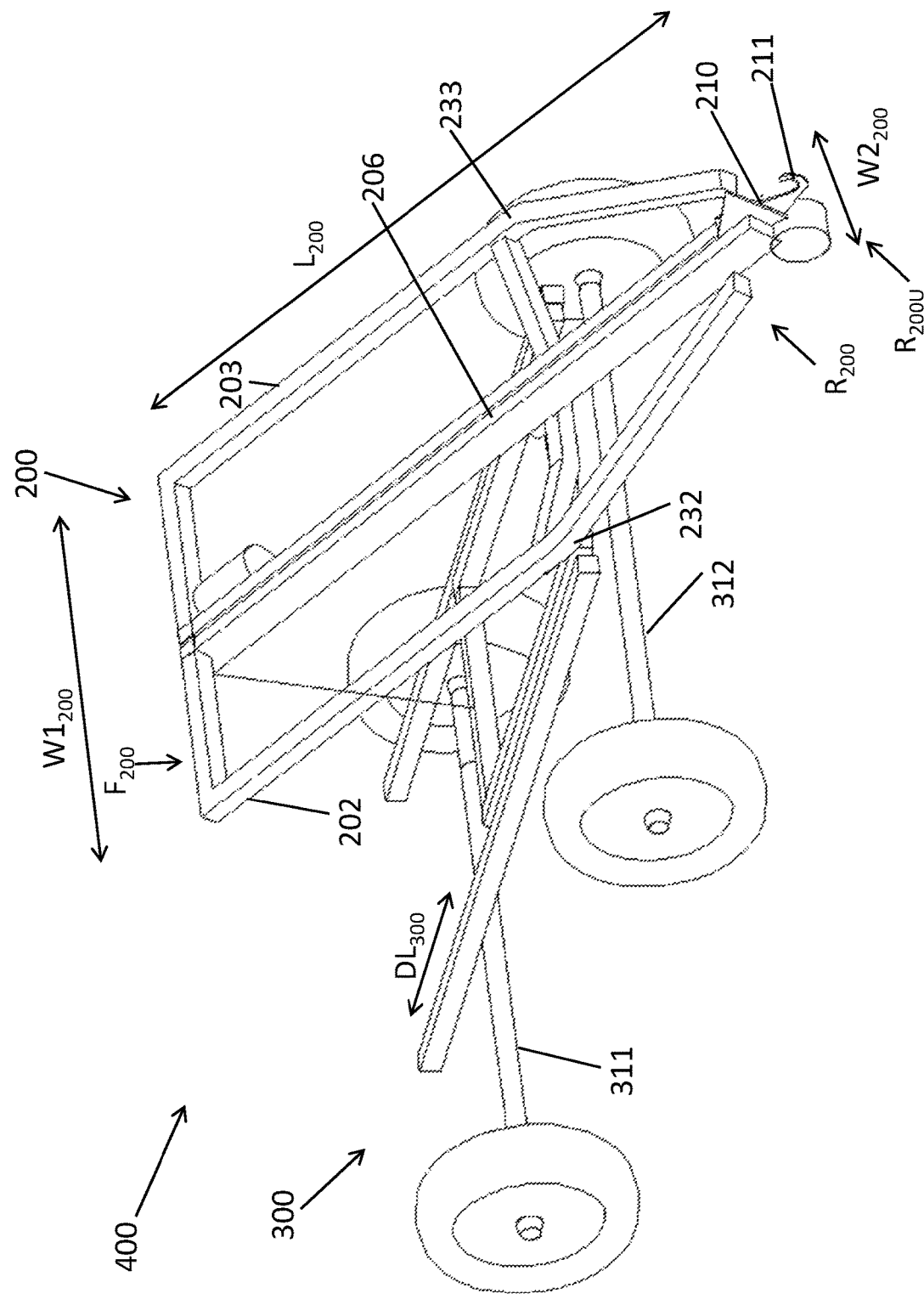
FIG. 1b shows a transport device.
Figure 1C:
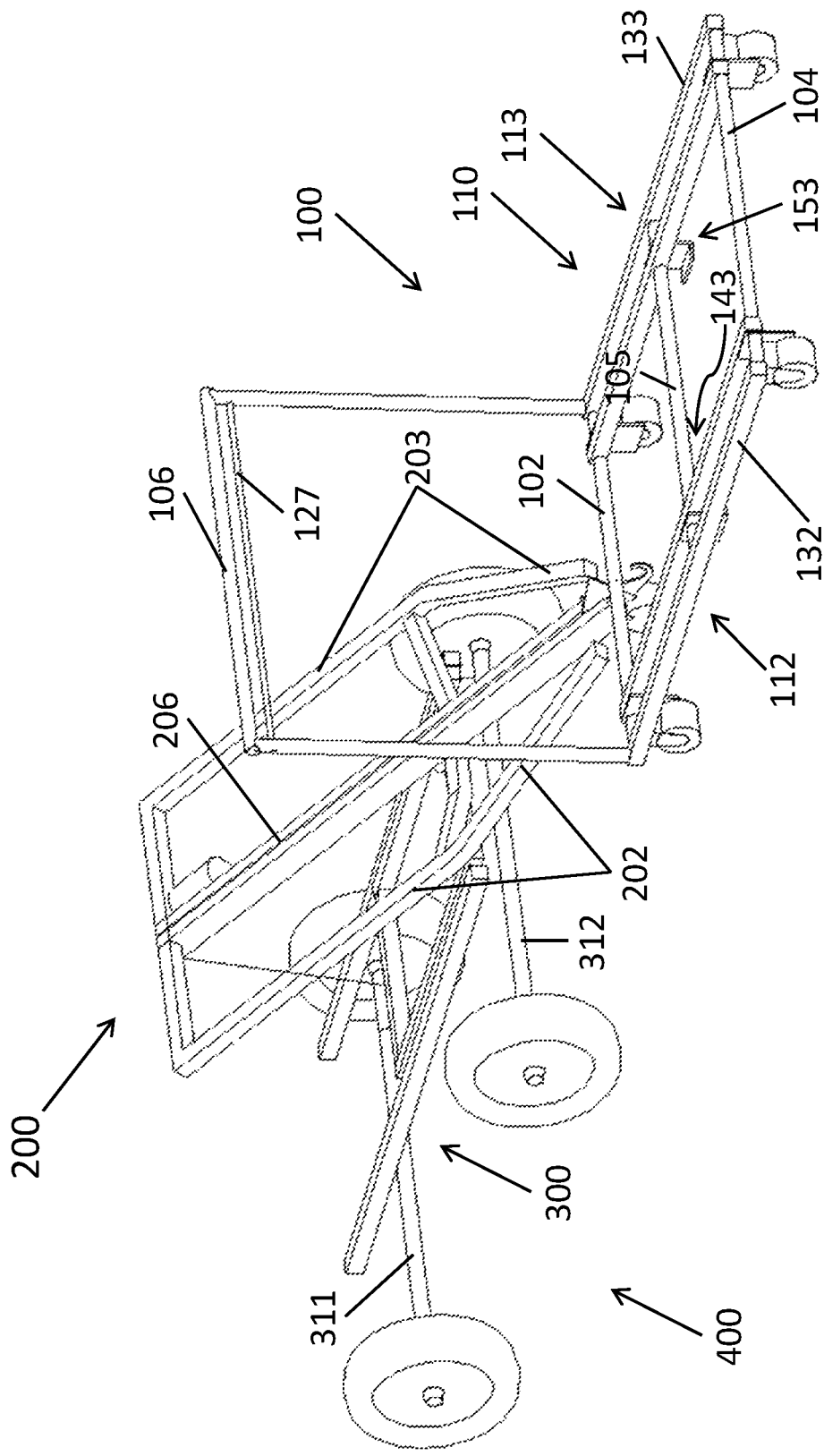
FIG. 1c shows a system comprising a transport device and a pallet.

A system for transporting goods is shown in FIG. 1c. The system comprises a pallet 100 and a transport device 400. The pallet 100 is configured to be loaded on a bed 200 of the transport device 400. In use, the bed 200 of the transport device 400 operates in connection with the pallet 100 as detailed below. Moreover, the pallet 100 may have features that enables the use of the pallet 100 manually in last mile transport. The bed 200 of the transport device 400, on the other hand, may be so light that it may be arranged as part of a light transport device. Moreover, side beams (202, 203) of the bed 200 and side parts (112, 113) of the pallet 100 function in combination and in combination with a rod 102 of the pallet in such a manner that autonomous loading from short distance becomes possible.

Figure 1D:
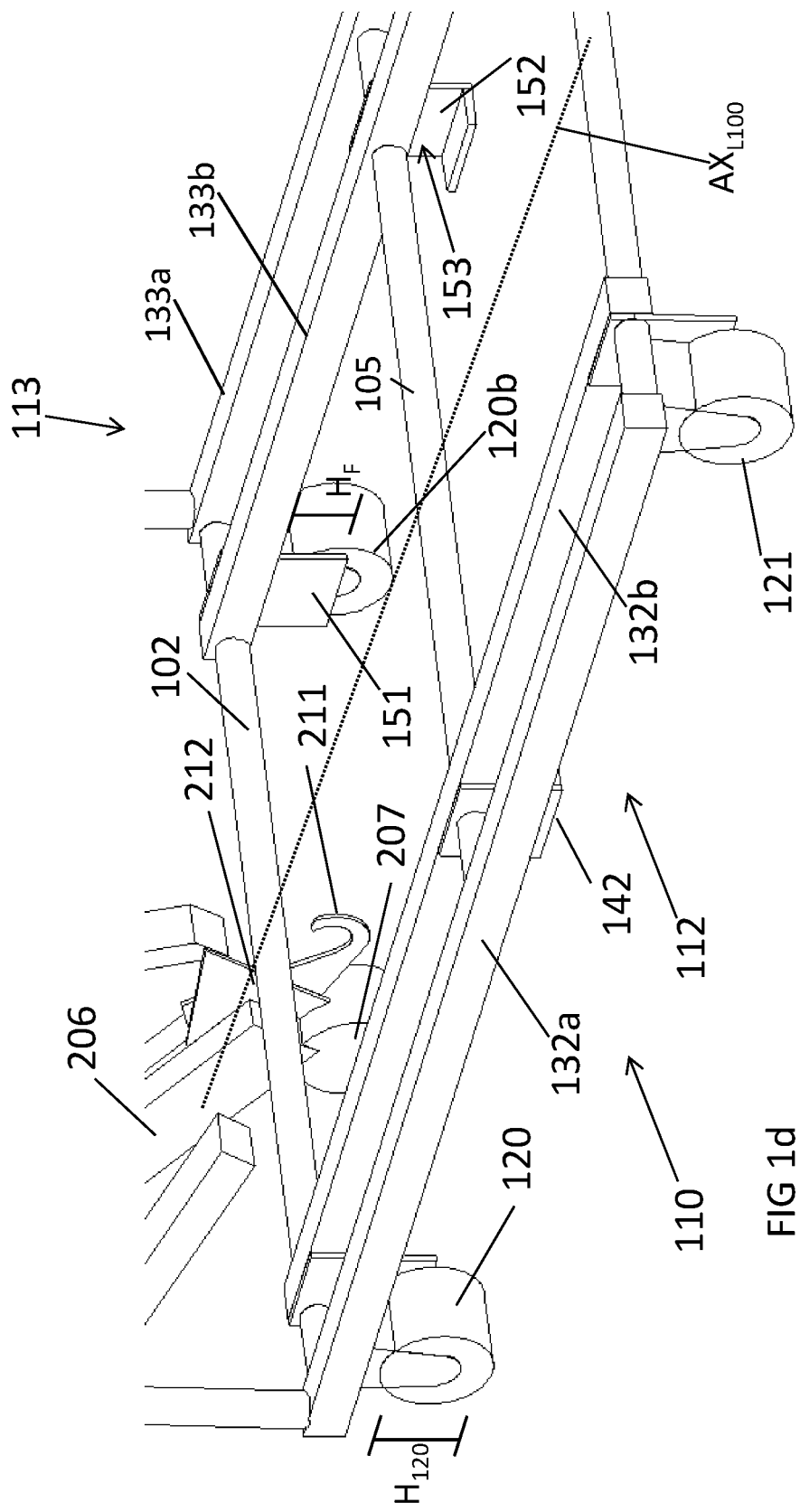
FIG. 1d shows a part of a pallet and a part of a loading and unloading arrangement of the transport device.
Figure 1F:
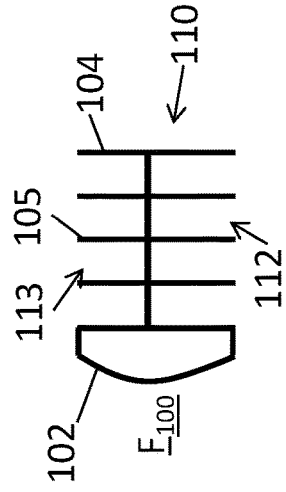
FIG. 1f shows schematically a frame of a pallet.
Figure 1E:
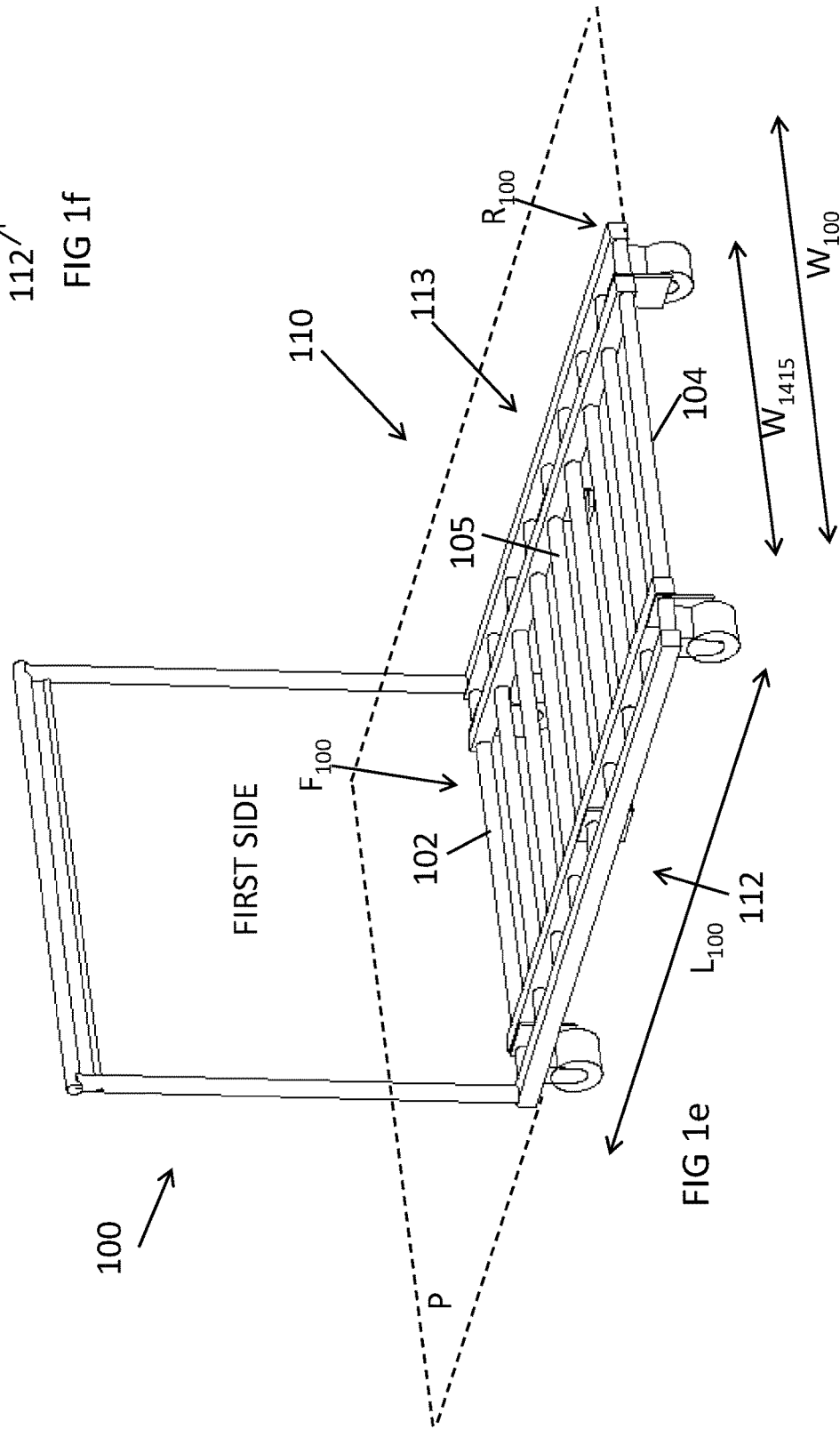
FIG. 1e shows an embodiment of a pallet.

FIGS. 1a and 1e show two embodiments of a pallet 100 is detail. The pallet comprises a frame 110 as depicted e.g. in FIGS. 1a and 1e. The frame 110 comprises a primary side part 112 and a secondary side part 113, which is opposite to the first side part 112. The side parts 112, 113 extend in a longitudinal direction of the pallet 100 at a primary side of the pallet and at a secondary side of the pallet 100, respectively. In this way, the frame 110 defines a front end $F_{100}$ of the pallet 100 and a rear end $R_{100}$ of the pallet 100. The length $L_{100}$ of the pallet 100 is left in between the front end $F_{100}$ and the rear end $R_{100}$. Since the frame 110 comprises the side parts 112, 113 and defines the ends $F_{100}$, $R_{100}$, the frame 110 also defines a plane P of the pallet 100. The pallet P is configured to receive goods (i.e. cargo) on a first side of the plane P of the pallet 100. The first side of the plane is indicated by the text "FIRST SIDE" in FIGS. 1*a* and 1*e*. The frame 110 may have the shape of a plate. In such an embodiment, the frame 110 does not have to comprise profiles. The frame 110 may comprise profiles extending in the plane P of the pallet 110 in different directions. Even in the frame comprises profiles, it may comprise a plate forming a solid floor of the pallet. The frame 110 may comprise side profiles 132, 133 and transversal rods 102, 104, 105. A longitudinal central axis $AX_{L100}$ of the pallet 100 is left in between the primary side part 112 and the secondary side part 113, as indicated in FIG. 1*d*.

A width $W_{100}$ of the pallet 100 is transverse to the length $L_{100}$ of the pallet. The length and width define the plane P of the pallet. The width $W_{100}$ of the pallet may depend on intended use and/or width of a bed 200 used for transporting the pallet 100. However, typical widths include 400 mm, 600 mm, 800 mm, and 1000 mm. Thus, a width $W_{100}$ of the pallet 100 may be from 400 mm to 1000 mm, such as from 500 mm to 800 mm.

Referring to FIG. 1*a*, in an embodiment, the pallet 100 comprises a primary side profile 132 at a primary side of the pallet 100 and a secondary side profile 133 at a secondary side of the pallet 100. The primary side profile 132 may constitute the primary side part 112 and the secondary side profile 133 may constitute the secondary side part 113. Preferably the side profiles 132, 133 run in parallel. Herein secondary side is opposite to the primary side. The primary side profile 132 and the secondary side profile 133 define a front end $F_{100}$ of the pallet 100 and a rear end $R_{100}$ of the pallet 100 by extending only form the front end $F_{100}$ to the rear end $R_{100}$ in a direction of length of a side profile 132, 133. In this way, the side profiles (132, 133) also define the length $L_{100}$ of the pallet 100. As for the height $H_{100}$ of the side profiles 132, 133, preferably a height $H_{100}$ (as measured in the direction of a normal of the plane P of the pallet 100) of the side profiles 132, 133 is at least 20 mm, more preferably at least 30 mm.

The length $L_{100}$ of the pallet may depend on intended use and/or length of a bed 200 used for transporting the pallet. However, typical lengths include 600 mm, 800 mm, 1000 mm, and 1200 mm, 1500 mm, or even 2400 mm. Thus, a length of the pallet 100 may be from 600 mm to 2400 mm, such as from 700 mm to 1500 mm.

The pallet 100 comprises a rod 102, i.e. a first rod 102, that extends from the primary side part 112 to the secondary side part 113 transverse to the side parts 112, 113 (i.e. unidirectional with the width $W_{100}$ of the pallet). A technical function of the rod 102 is that the pallet 102 can be loaded onto a bed 200 of the transport device 400 by pulling from the rod 102. In addition, the pallet 102 can be unloaded from the bed 200 by pushing from the rod 102. Moreover, for the transport device to grab the pallet 100 in an autonomous manner, the rod 102 is arranged close to the front end $F_{100}$. More specifically, a distance between the rod 102 and the front end $F_{100}$ of the pallet 100 is at most one fourth (i.e. at most 25%, preferably at most 15%) of the length $L_{100}$ of the pallet 100. This short distance has two effects. First, a means for grabbing the rod, such as a hook 211, is much easier to connect to the rod 102, when the rod 102 is near the front end $F_{100}$ than if it was arranged further away. Moreover, when the length of the pallet 100 is not directed towards the bed 200 of the transport device, the pallet 100 needs to be turned during loading. The loading force needed to turn the pallet 100 remains small when the rod 102 is near the front end $F_{100}$, since in that case the loading force imposes a greater torque to the pallet 100. Another technical function of the rod 102 is to mechanically support the primary side part 112 to the secondary side part 113. Moreover, a primary end of the rod 102 may form a part of the primary side part 112 and a secondary end of the rod 102 may form a part of the secondary side part 113.

Figure 2A:
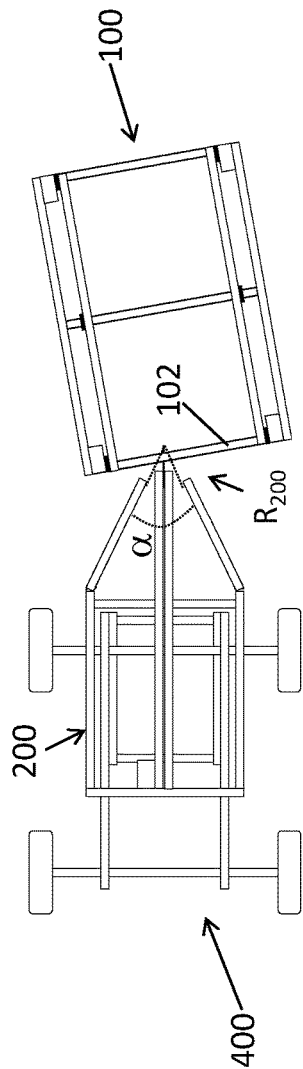
FIG. 2a to 2f show, in a top view, loading or unloading a pallet to/from a transport device.

Even if the rod 102 extend from the primary side part 112 to the secondary side part 113, it needs not extend straight. Referring to FIG. 1*f*, the rod 102 may be curved. A curved rod 102 may centre the pallet 100 relative to the bed 200 even more effective than a straight rod. However, a substantially straight rod may be beneficial for storing the pallet 100. Moreover, an angle α between side beams 202, 203 of the bed can be selected such that sufficient centring is obtained. The angle α is shown in FIG. 2*a* and detailed below.

Moreover, the pallet 100 comprises a primary foot arrangement 140 fixed to the primary side part 112, and a secondary foot arrangement 150 fixed to the secondary side part 113. A purpose of these foot arrangements 140, 150 is to engage with side beams 202, 203 (respectively) of a bed 200 of the transport device 400. A purpose of first parts 141, 151 (i.e. a front parts) of the foot arrangements 140, 150 of the pallet 100 is to guide the front end $F_{100}$ of the pallet 100 to a correct position on the bed 200 of the transport device. A purpose of second parts 142, 152 (i.e. a middle parts) of the foot arrangements 140, 150 of the pallet 100 is to guide a middle part of the pallet 100 to a correct position on the bed 200 whereby the directions of the lengths of the pallet 100 and the bed 200 become unidirectional. Another purpose of the second parts is to fix the pallet 100 to the bed 200. For the purpose of fixing, slots 143, 153 may be provided as discussed below.

For these reasons, the primary foot arrangement 140 is arranged at the primary side part 112. In an embodiment, the primary foot arrangement 140 is fixed to the primary side profile 132. Moreover, the primary foot arrangement 140 comprises a first part 141 and a second part 142. In order to engage with a side beam 202 of the bed 200, the first part 141 of the primary foot arrangement 140 protrudes from the plane P of the pallet (e.g. from primary side profile 132) in the direction of normal of the plane P of the pallet 100 on a second side of the plane P of the pallet, which second side of the plane P of the pallet is opposite to the first side of the plane P of the pallet. Moreover, the first part 141 is arranged close to the front end $F_{100}$ of the pallet 100. Thus, a distance between the first part 141 of the primary foot arrangement 140 and the front end $F_{100}$ of the pallet 100 is at most 20% of the length $L_{100}$ of the pallet 100. In order to engage with a side beam of the bed 200, the second part 142 of the primary foot arrangement 140 protrudes from plane P of the pallet (e.g. from the primary side profile 132) in the direction of normal of the plane P of the pallet 100 on the second side of the plane P of the pallet 100. Moreover, for the first and second parts 141, 142 to generate torque to align the pallet 100 with the bed 200, a distance between the first and second parts 141, 142 should be sufficiently large. Moreover, the second part 142 should engage with such a part of a side beam 202 of the bed that runs in a longitudinal direction of the bed 200. I.e. with such a part of the side beam that the width of the bed 200 remains constant irrespective of the position close to that part. For these reasons, a distance between the second part 142 of the primary foot arrangement 140 and the front end $F_{100}$ of the pallet 100 is from 30% to 70%, preferably from 40% to 60%, of the length $L_{100}$ of the pallet 100.

What has been said about the primary foot arrangement 140 applies, mutatis *mutandis*, to the secondary foot arrangement 150. Thus, the secondary foot arrangement 150 is arranged at the secondary side part 113. In an embodiment, the secondary foot arrangement 150 is fixed to the secondary side profile 133. The secondary foot arrangement 150 comprises a first part 151 and a second part 152. Moreover: the first part 151 of the secondary foot arrangement 150 protrudes from the plane P of the pallet (e.g. from a secondary side profile 133) in the direction of normal of the plane P of the pallet 100 on the second side of the plane P of the pallet; a distance between the first part 151 of the secondary foot arrangement 150 and the front end $F_{100}$ is at most 20% of the length $L_{100}$ of the pallet 100; the second part 152 of the secondary foot arrangement 150 protrudes from the plane P of the pallet (e.g. from a secondary side profile 133) in the direction of normal of the plane P of the pallet 100 on the second side of the plane P of the pallet 100; and a distance between the second part 152 of the secondary foot arrangement 150 and the front end $F_{100}$ is from 30% to 70% (preferably from 40% to 60%) of the length $L_{100}$ of the pallet 100.

The rod 102 has a length $L_{102}$. The length $L_{102}$ of the rod in combination with widths of the side profiles 132, 133 may equal the width $W_{100}$ of the pallet 100. A span of the rod 102 is at least half of the length $L_{102}$ of the rod. As generally defined, the span refers to a length between supports. In other words, an object that encircles the rod 102 can be freely moved in the direction of length of the rod for the span, i.e. from a support to another support. A relatively long span has the technical effect that the pallet 100 can be grabbed from various locations e.g. by a hook 211 or similar. Thus, when loading, the hook 211 may move relative to the rod 102 in the direction of the rod 102 for a relatively long distance, since the span is relatively long. In this way, a long span improves to autonomous loading of the pallet 100 to the bed 200 of the transport device 400. In an embodiment, the span of the rod 102 is at least 300 mm, preferably at least 400 mm or at least 500 mm.

A transversal distance $W_{1415}$ between the primary foot part 140 and the secondary foot part 150 is depicted in FIGS. 1a and 1e. The transversal distance is unidirectional with the width $W_{100}$ of the pallet 100. Typically, the transversal distance $W_{1415}$ is e.g. from 20 mm to 300 mm less than the width $W_{100}$ of the pallet. Preferable measures for the transversal distance $W_{1415}$ include 400 mm, 600 mm, and 800 mm. In an embodiment, the width $W_{100}$ is 800 mm (one significant digit) and the transversal distance $W_{1415}$ is 600 mm (one significant digit). Having the width $W_{100}$ equal to 800 mm has the benefit that the width corresponds to a width of a standard EUR pallet. Having the transversal distance $W_{1415}$ equal 600 mm has the effect that sufficiently wide supports can be applied to the pallet 100. It is also noted that the side parts 112, 113 of the frame 110 may be arranged somewhat closer to each other than the distance $W_{1415}$, since parts of the side parts 112, 113 are configured to be supported by the side beans 202, 203 of the bed 200. For example, a distance between the side parts 112, 113 may be 40 mm to 100 mm less than the transversal distance $W_{1415}$. The span of the rod 102, as discussed above, may be related to these values. For example, in an embodiment, the span of the rod 102 is at least 50%, more preferably at least 75%, of transversal distance $W_{1415}$ between the primary foot part 140 and the secondary foot part 150.

Preferably the frame 110 comprises metal that has a melting point of at least 200° C. Such metals include iron, steel, aluminium and titanium. In an embodiment, the primary side profile 132 and the secondary side profile 133 are made from a metal that has a melting point of at least 200° C. Preferably the rod 102 is made from a metal that has a melting point of at least 200° C., not necessarily the same metal as the side profiles 132, 133. Such metals include iron, steel, aluminium and titanium.

Even if also FIG. 1e shows side profiles, such side profiles are not necessary. As an example, a single longitudinal profile arranged in the centre of the pallet 100 could bind the transversal profiles including 105 (except the rod 102 and optionally also the second rod 104, see below) together to form a part of the frame 110. Such an embodiment is schematically shown in FIG. 1f. Then, the rod 102 could be fixed to an adjacent transversal profile from its ends as indicated. Foot arrangement 140, 150 could be fixed directly to the transversal profiles.

For aligning the pallet 100 with a bed 200, in an embodiment, the primary side profile 132 and the secondary side profile 133 run (i.e. extend) in the same direction, from the front end $F_{100}$ of the pallet 100, towards the rear end $R_{100}$ of the pallet 100 for a distance that is at least a half of the length $L_{100}$ of the pallet 100. More preferably, the primary side profile 132 and the secondary side profile 133 run in parallel throughout their lengths. This helps manufacturing of the pallet 100 and provides a sturdy support for a floor if the pallet 100, if a floor is used.

Preferably, the pallet 100 comprises a transversal support in addition to the rod 102. The transversal support may be arranged closer to the rear end $R_{100}$ than the front end $F_{100}$ to support the pallet. The transversal support may form a second rod 104. The second rod 104 may function as the first rod 102, so that the pallet 100 may be pulled onto a bed 200 from the second rod 104 as an alternative to the first rod 102. In such a case, the second rod 104 extends from the primary side profile 132 to the secondary side profile 133 transverse to the side profiles (132, 133), wherein a distance between the second rod 104 and the rear end $R_{100}$ is at most one fourth of the length $L_{100}$ of the pallet 100. Moreover, a span of the second rod 104 is at least half of the length of the second rod 104. What has been said about the span of the first rod 102 applies to the span of the second rod 104 mutatis *mutandis*.

Furthermore, in order to have the guiding foot arrangement also at the rear end $R_{100}$ if the second rod 104 is used for pulling the pallet 100, in such a case the primary foot arrangement 140 comprises a third part 144, wherein the third part 144 of the primary foot arrangement 140 protrudes from the plane P of the pallet (e.g. from the primary side profile 132) in the direction of normal of the plane P of the pallet 100 on the second side of the plane P of the pallet 100, and a distance between the third part 144 of the primary foot arrangement 140 and the rear end $R_{100}$ is at most 20% of the length $L_{100}$ of the pallet 100. In a corresponding manner, the secondary foot arrangement 150 comprises a third part 154, wherein the third part 154 of the secondary foot arrangement 150 protrudes from the plane P of the pallet (e.g. from the secondary side profile 133) in the direction of normal of the plane P of the pallet 100 on the second side of the plane P of the pallet 100, and a distance between the third part 154 of the secondary foot arrangement 150 and the rear end $R_{100}$ is at most 20% of the length $L_{100}$ of the pallet 100.

Another beneficial location for a transversal support is a central part of the pallet. This is beneficial, since when the pallet is being loaded onto a bed 200, which may be configured to tilt, preferably, the pallet 110 tilts with the bed 200. This can be achieved by providing the pallet 100 with a transversal support at a central area. Thus, in an embodiment, the pallet 100 comprise a middle rod 105 that extends from the primary side part 112 to the secondary side part 113 transverse to the side parts (112, 113), as indicated in FIGS. 1a and 1e. A distance between the middle rod 105 and the front end $F_{100}$ of the pallet 100 may be e.g. from one third to two thirds of the length $L_{100}$ of the pallet 100. As an example, when the pallet 100 comprises the rod 102, the second rod 104, and two middle rods 105, these middle rods may be arranged one third of the length $L_{100}$ from the ends $F_{100}$, $R_{100}$. In case there are a greater number of transversal rods, as in FIG. 1e, or only three rods, as in FIG. 1a, one of them is preferably located even more centrally.

For the foot arrangements 140, 150 to guide the pallet 100 onto the bed 200, a height $H_F$ (see FIG. 1d) of the foot arrangements 140, 150 should be sufficient. The height $H_F$ is directed in a direction of a normal of the plane P of the pallet 100. Thus, in an embodiment each one of a height of the first part 141 of the primary foot arrangement 140, a height of the second part 142 of the primary foot arrangement 140, a height of the first part 151 of the secondary foot arrangement 150, and a height of the second part 152 of the primary foot arrangement 150 are at least 20 mm, preferably least 30 mm. As for an upper limit for these heights, if the foot arrangements 140, 150 serve also as feet, i.e. means for supporting the pallet 100 in the direction of a normal N of the plane P of the pallet, the height $H_F$ may be e.g. at most 200 mm such as at most 120 mm, such as at most 100 mm. However, if a wheel 120, 121 serves as such a support, then, preferably, the height $H_F$ of the foot arrangements is less than a height $H_{120}$ of the wheel. Moreover, if a separate support is used for the purpose, preferably, the height $H_F$ of the foot arrangements is less than a height of the separate support. However, as indicated above, a part of a feet (or support) may form at least a part of the either one of the foot arrangements 140, 150.

As indicated in FIG. 1a, the first parts 141, 151 of the foot arrangements 140, 150 may be separate from the second parts 142, 152 of the foot arrangements 140, 150. In the alternative, in at least one of the foot arrangements 140, 150 the first (141, 142) and second (142, 152) may be integral. In such a case, the foot arrangement would comprise an integral plate or similar that comprises both the parts (141 and 142; or 151 and 152). This applies also to the third parts 144 and 154 of the foot arrangements, if present.

Before disclosing further details of embodiments of the pallet 100, an embodiment of the transport device 400 is disclosed, and the mutual functioning of the pallet 100 and the transport device 400 is discussed.

FIG. 1b shows a transport device 400 without a pallet 100. The transport device 400 comprises a chassis 300 having a first axle 311. In case the transport device is a trailer, the chassis may comprise only one axle. In such a case, the cassis comprises a beam for pulling the chassis 300. In such a case, the beam comprises means for fixing the beam to a vehicle. In that case, the beam of the chassis, which is for pulling the chassis, defines a direction of length $DL_{300}$ for the chassis 300, and the beam and the axle 311 in combination define the plane of the chassis. In other some other cases, the chassis 300 have the first axle 311 and a second axle 312. In that case, the axles 311, 312 define a plane of the chassis 300 and a direction of length $DL_{300}$ for the chassis 300. The axles 311, 312 are parallel, and the direction of length $DL_{300}$ of the chassis 300 is perpendicular to the axles 311, 312. Preferably the chassis 300 comprises at least two wheels (e.g. in case of a trailer), or at least three wheels (e.g. in case of a tricycle), such as four wheels. Each wheel may have its own axle, or at least two wheels may be arranged to rotate about or with only one axle.

The transport device 400 comprises a bed 200. The bed 200 is configured to receive a pallet 100 as discussed in detail later. Referring to FIG. 1b, the bed 200 comprises a first side beam 202 at a first side of the bed 200 and a second side beam 203 at a second side of the bed 200, the second side of the bed 200 being opposite the first side of the bed 200. In this way, the first side beam 202 and the second side beam 203 define a plane of the bed 200. Thus, both the side beams 202, 203 extend in the plane of the bed 200 through their whole lengths. Moreover, the first side beam 202 and the second side beam 203 define a front end $F_{200}$ of the bed 200 and a rear and $R_{200}$ of the bed 200. A length of the bed $L_{200}$ is left in between the front end $F_{200}$ of the bed 200 and a rear end $R_{200}$ of the bed 200. As indicated in FIG. 1b, a part of the transport device 400, such as a loading and unloading arrangement 206 may exceed the rear end $R_{200}$ of the bed defined by the side beams. Thus, parts of the bed 200 or the transport device may extend to an ultimate rear end $R_{200U}$ of the bed such the rear end $R_{200}$ of the bed 200 is arranged in between the ultimate rear $R_{200U}$ end and the front end $F_{200}$. However, preferably, even if the rear end $R_{200}$ and the ultimate rear end $R_{200U}$ are not the same, preferably, the loading and unloading arrangement 206 does not extend long way behind the rear end $R_{200}$. Therefore, in an embodiment, and ultimate length $L_{200U}$ of the bed, defined as a distance between the ultimate rear end $R_{200U}$ and the front end $F_{200}$ of the bed 200, is at most 25%, preferably at most 10% greater than the length $L_{200}$ of the bed.

Both the first side beam 202 and the second side beam 203 run, from the front end $F_{200}$ of the bed 200, in the same direction towards the rear end $R_{200}$ for a distance that is at least a half of the length $L_{200}$ of the bed 200. In case the bed 200 is long (e.g. relative to the pallet 100), both the first side beam 202 and the second side beam 203 may run, from the front end $F_{200}$ of the bed 200, in the same direction towards the rear end $R_{200}$ for a distance that is at least 75% of the length $L_{200}$ of the bed 200. In other words, from the front end $F_{200}$, the side beams 202, 203 run in such a way that a distance between the first side beam 202 and the second side beam 203 remains constant towards the rear end $R_{200}$.

When the side beams 202, 203 run (i.e. extend) in such a manner, they function together with the first (141, 151) and second (142, 152) parts of the foot arrangements 140, 150 of the pallet 100. They function such that when the front end $F_{100}$ of the pallet 100 is pulled to the front end $F_{200}$ of the bed 200, the foot arrangements 140, 150 of the pallet 100 align the pallet with the bed 200 such that the lengths of the pallet 100 and the bed are unidirectional. This is depicted in e.g. in FIG. 2d. For this reason, the side beams 202, 203 of the bed 200 run in the same direction from the front end $F_{200}$ of the bed 200 towards the rear end $R_{200}$ of the bed for a distance that is at least a half of a length of the bed $L_{200}$. Thus, the first side beam 202 runs from the front end $F_{200}$ in parallel with the second side beam 203 towards the rear end $R_{200}$ of the bed 200 until a first bend point 232. Moreover, the second side beam 203 runs from the front end $F_{200}$ in parallel with the first side beam 202 towards the rear end $R_{100}$ of the bed 200 until a second bend point 233 (see FIG. 1b).

Moreover, the first side beam 202 and the second side beam 203 run, from the rear end $R_{200}$ of the bed 200, in such a way that a distance between the first side beam 202 and the second side beam 203 increases towards the front end $F_{200}$ of the bed 200. Thus, the bed 200 has a first width $W_{1200}$ at the front end $F_{200}$ of the bed 200 and a second width $W_{2200}$ at the rear end $R_{200}$ of the bend 200, wherein the second width $W_{2200}$ is smaller than the first width $W_{1200}$. In front of (i.e. on the side of the front end $F_{200}$) the bend points 232, 233, the side beams 202, 203 run in parallel (i.e. in the same direction). Behind (i.e. on the side of the rear end $R_{200}$) the bend points 232, 233, the side beams 202, 203 run such that the bed 200 tapers towards the rear end $R_{200}$.

Figure 2B:
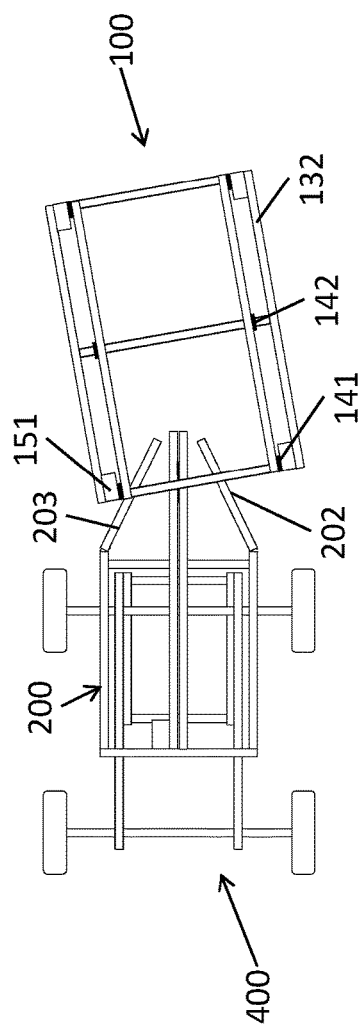

When the side beams 202, 203 run (i.e. extend) in such a manner, they function together with the first (141, 142) parts of the foot arrangements 140, 150 of the pallet 100. When the pallet 100 is being loaded onto the bed 200, the pallet 100 is pulled from the rod 102 and from outside of the bed area towards the rear end $R_{200}$ of the bed 200. At some point of loading, one of the first parts 141, 151 of the foot arrangements 140, 150 of the pallet 100 hits a rear part of a side beam 202, 203 of the bed. Here a rear part refers to a part behind the bend points 232, 233. When further loaded, the tapering shape of the rear part of the bed 200 makes the front end $F_{100}$ of the pallet 100 to move in a transversal direction of the bed 200. Moreover, since the span of the rod 102 of the pallet is relatively large (see above), such movement is enabled. This is shown in FIGS. 2a and 2b. In this way, the loading of the pallet automatically centers the front end $F_{100}$ of the pallet 100 relative to front end $F_{200}$ of the bed 200. In addition, the pallet and the bed will be aligned, as detailed above.

For these reasons, in an embodiment of a system for transporting goods, a distance between the primary foot arrangement 140 of the pallet 100 and the secondary foot arrangement 150 of the pallet 100 is at least equal to and at most 20 mm greater than a distance between the outer edge of the first side beam 202 of the bed 200 and an outer edge of the second side beam 203 of the bed 200 at the front end $F_{200}$ of the bed 200. Herein, the distance between the primary foot arrangement 140 and the secondary foot arrangement 150 is measured in the transverse direction of the pallet 100.

Since the bed 200 is configured to function with a pallet in this manner, a distance is left in between a bend points 232, 233 of the side beams 202, 203 and the front end $F_{200}$. Preferably, this distance is at least 50% of the length of the bed 200. However, this distance may be e.g. at least 60% or at least 75% of the length of the bed 200. Preferably, the rear, tapering, part of the side beams 202, 203 is not too steep to allow for smooth loading of the pallet 100. Thus, in an embodiment an angle $\alpha$ (see FIG. 2a) between the longitudinal directions of the first side beam 202 and the second side beam 203 at a rear part of the first side beam 202 (i.e. behind the bend point 232) is from 15 to 120 degrees, such as from 30 to 90 degrees or such as from 30 to 75 degrees.

In an embodiment, the second width $W_{2200}$ (i.e. the width of the bed 200 in its rear end $R_{200}$) is at least one third smaller than the first width $W_{1200}$ (i.e. the width of the bed 200 in its front end $F_{200}$). More preferably, the ratio $W_{2200}/W_{1200}$ of the is at most 50%, at most 33% or at most 25%. The rear ends of the side beams 202, 203 may be in contact with a central beam that forms a part of a loading and unloading device 206.

Preferably the first side beam 202 and the second side beam 203 are made from a metal that has a melting point of at least 200° C. For examples of such metals, see above.

The transport device 400 comprises a first articulation 241 (see FIG. 2c) for turning the bed 200 relative to the chassis 300 about (i) an axle that is unidirectional with a normal of the plane of the bed 200 or (ii) an axle that is unidirectional with a normal of the plane of the chassis 300. This has the effect that when a pallet 100 is loaded, the bed 200 turns in such a manner the length of the bed 200 becomes directed towards the pallet 100. This turning may be enhanced by a rope or a cable 220 as detailed below.

The transport device 400 comprises a second articulation 242 (see FIG. 3a) for turning the bed 200 relative to the chassis 300 about an axis that is unidirectional with a width of the bed 200 or unidirectional with a width of the chassis 300. Herein the width of the bed 200 is perpendicular to the length of the bed 200 and the width of the chassis 300 is perpendicular to the length of the chassis 300. Moreover, the width of the bed 200 is within the plane of the bed 200. This has the effect, that when a pallet 100 is loaded, the bed 200 can be tilted in such a way that the rear end $R_{200}$ of the bed is arranged at a lower vertical level than the front end $F_{200}$ of the bed 200 (see FIG. 3a). Thus, when the pallet 100 is loaded, the front end $F_{100}$ needs not to be separately lifted. However, when the bed 200 is tilted, the frond end $F_{100}$ of the pallet 100 rises while pulling onto the bed 200.

The two articulations 241 and 242 may be implemented by using a single universal joint (i.e. Hooke's joint).

The longitudinal position of the second articulation 242 is preferably substantially the same as the longitudinal position of the bend points 232, 233 of the side beams 202, 203. In the alternative, the second articulation 242 is slightly behind the bend points 232, 233 of the side beams 202, 203. More specifically, in an embodiment, ratio of (i) a distance between the second articulation 242 and the front end $F_{200}$ to (ii) a distance between the first bend point 232 and the front end $F_{200}$ is from 90% to 150%. This has the effect that when a pallet 100 is being loaded, the bed 200 starts to turn towards an untilted (e.g. horizontal) position at a correct time.

Referring to FIGS. 1b and 1c, the transport device 400 comprises a loading and unloading arrangement 206. The loading and unloading arrangement 206 is for loading a pallet 100 onto the bed 200 from the rear end $R_{200}$ of the bed 200 by pulling the pallet 100 from the rod 102. Moreover, the loading and unloading arrangement 206 is for unloading a pallet 100 from the bed 200.

The loading and unloading arrangement 206 may comprise both a loading device for loading a pallet 100 onto the bed 200 from the rear end $R_{200}$ and a separate unloading device (separate from the loading device) for unloading a pallet 100 from the bed 200. In the alternative, the loading and unloading arrangement may comprise only one loading and unloading device for loading a pallet 100 onto the bed 200 from the rear end $R_{200}$ and for unloading a pallet 100 from the bed 200.

Referring to FIGS. 1b, 5a, and 5b, in an embodiment, the loading and unloading arrangement 206 comprises a carrier 210 configured to move in between the front end $F_{200}$ and the rear end 8200 (or the ultimate rear end $R_{200U}$) in the direction of length of the bed 200. The loading and unloading arrangement 206 comprises a means for moving the carrier 210 and an openable and closable hook 211 fixed to the carrier 210. The means for moving the carrier 210 may comprise e.g. a rotatable axle, e.g. manually rotatable axle, or a screw to which a separate drill can be attached, which, upon rotating, is configured to move the carrier 210. Preferably the means for moving the carrier 210 comprises an electric motor configured to move the carrier 210. An electric motor is preferable over other types of motors, since they are robust and environment friendly. In such a case, the transport device may comprise a battery, preferably rechargeable battery, configured to supply electricity to the electric motor.

When the hook 211 is open, it may be fixed to the rod 102 of the pallet 100 (see FIG. 5b). When the hook 211 is closed, the rod 102 of the pallet 100 is securely fixed to the hook 211 (see FIG. 5a). In an embodiment, the hook 211 is configured to be fixed to the rod 102 of pallet 100 in an openable manner. Moreover, in an embodiment, the hook 211 is configured to be in an open position when the carrier is at the rear end $R_{200}$, or at the ultimate rear end Ram. Thus, the rod 102 can be arranged to the hook. Moreover, the hook 211 is configured to be in a closed position when the carrier is at the front end $F_{200}$. Thus, the pallet 100 is securely fastened from the rod 102 to the carrier 210, and via the carrier 210 to the bed 200 while transporting the pallet 100 and optionally the goods on the pallet 100.

In an embodiment, the loading and unloading arrangement 206 comprises an opening and closing means 212 for the operating the hook 211. The opening and closing means 212 is configured to move the hook 211 from the open position to the closed position, when the carrier 210 moves from the (ultimate) rear end $R_{200}$ or $R_{200U}$ of the bed 200 to the front end $F_{200}$ of the bed 200. Moreover, the opening and closing means 212 is configured to move the hook 211 from the closed position to the open position when the carrier 210 moves from the front end $F_{200}$ of the bed 200 to the (ultimate) rear end $R_{200}$ or $R_{200U}$ of the bed 200.

Referring to FIGS. 5a and 5b, the opening and closing means 212 may function in connection with a profile 217. FIG. 5a shows a situation, when the carrier 210 is at the front end $F_{200}$ of the bed 200. As shown in the figure, the profile 217, to which the opening and closing means 212 is connected in a pivotable manner, turns the opening and closing means 212 in the clockwise direction relative to FIG. 5b, since the profile 217 is arranged at a high vertical position relative to FIG. 5b. Correspondingly, in FIG. 5b, which shows a rear end $R_{200}$ of the bed 200, the profile 217 runs at a lower vertical level. As shown in FIG. 5b, when the carrier 210 moves rearwards (i.e. to the right in FIG. 5b) the shape of the profile 217 turns the opening and closing means 212 counter-clockwise, thereby opening the hook 211. Moreover, when the carrier 210 moves frontwards (i.e. to the left in FIG. 5b) the shape of the profile 217 turns the opening and closing means 212 clockwise, thereby opening the hook 211 to the position shown in FIG. 5a.

The carrier 210 may be connected to a screw 218, e.g. a threaded rod that runs in the direction of length of the bed 200. Correspondingly, the carrier 210 may comprise a nut, such as a ball nut or a lead nut. Thus, when the screw 218 rotates, the nut moves in the longitudinal direction of the screw 218 when rotation of the nut is prevented. In an embodiment, the electric motor is of the loading and unloading arrangement 206 is configured to rotate the screw 218. Moreover, the carrier 210 is configured to move towards the rear end $R_{200}$ of the bed 200 when the screw 218 rotates in a first direction and the carrier 210 is configured to move towards the front end $F_{200}$ of the bed 200 when the screw 218 rotates in a second direction that is opposite to the first direction. As indicated above, the screw 218 may be operated manually or using an external motor not part of the transport device 400.

As an alternative to a screw, a chain conveyor type solution may be used. Thus, in an embodiment, the electric motor in configured to rotate a gear wheel, the gear wheel is configured to engage a chain loop, and the carrier 210 is fixed to the chain loop. It is also possible to use ropes and/or cables to move the carrier, e.g. as indicated in the document WO 2013/178883.

In order to prevent overload of the electric motor of the loading and unloading arrangement, in an embodiment, the loading and unloading arrangement 206 is configured to stop the electric motor of the loading and unloading arrangement 206 when the carrier 210 reaches a predefined position near the front end $F_{200}$ of the bed 200. For this reason, the transport device 400 may comprise a sensor configured to sense the position of the carrier 210. Moreover, the transport device 400 may comprise control unit the is configured to receive a signal from the sensor, and based on the signal, stop the electric motor of the loading and unloading arrangement 206 from running.

In order to reduce friction and/or wear of the side beams 202, 203 at least parts of the side beams 202, 203 may be covered with covering material. Suitable covering materials include plastics. Friction and wear in combination with a pallet as discussed above occurs mainly on a top side of the side beams, which contact with the frame 110 (e.g. transversal profiles) of the pallet 100; as well as on the outer edge of the side beams, which contact with the foot arrangements 140, 150 of the pallet during loading. In an embodiment, at least top sides of the side beams 202, 203 are provided with covering. In an embodiment, also outer sides of the side beams 202, 203 are provided with covering.

The transport device 400 may be a light vehicle, such as any one of the following:
- a tricycle, which may have the bed 200 in it front end or rear end of the tricycle,
- a bicycle, which may have the bed 200 in it front end or rear end of the bicycle,
- a pickup,
- a passenger car,
- a trailer for a vehicle,
- a scooter, which may have the bed 200 in it front end or rear end of the scooter,
- a trolley, optionally with a drive system, such as electric drive system,
- a pushcart, optionally with a drive system, such as electric drive system,
- an autonomous robot platform, or
- unstaffed vehicle.

Turning now to a preferred embodiment of the pallet 100, in an embodiment, the rod 102 has a circular cross section, which may be hollow or integral. The rod 102 does not need to have a circular cross section. In the alternative or in addition, the rod 102 may rotatable relative to the primary and secondary side profiles (132, 133) of the pallet 100 about an axis that is parallel to the length $L_{102}$ of the rod 102. If the rod 102 is rotatable relative to the frame 110, the cross section thereof is preferably circular. This has the effect that when the pallet 100 is pulled onto the bed, the rod 102 may act as a wheel and in this way ease the pulling of the pallet. Preferably, the rod 102 has a circular cross section and a diameter from 15 mm to 45 mm, such as from 15 mm to 30 mm or from 20 mm to 25 mm.

Referring to FIGS. 1a, 1c, 4b, 4c, and 4d, in an embodiment, the second part 142 of the primary foot arrangement 140 forms a primary slot 143 that opens towards the secondary side part 103 (e.g. towards the secondary side profile 133) of the pallet 100, whereby the primary 143 slot is configured to receive a part of the first side beam 202 of the bed 200 of the transport device 400. Moreover, the second part 152 of the secondary foot arrangement 150 forms a secondary slot 153 that opens towards the primary side part 112 (e.g. towards the primary side profile 132) of the pallet 100, whereby the secondary slot 153 is configured to receive a part of the second side beam 203 of the bed 200 of the transport device 400. Preferably a depth of the slot 143, 153, as measured in the direction of width $W_{100}$ of the pallet 100, is at least 20 mm, such as at least 30 mm.

In this way, the pallet 100 becomes locked to the side beams of the bed, when the parts of the side beams 202, 203 of the bed are arranged within the slots 143, 153. This is shown, only for one side of the system, in FIG. 4c. However, the pallet 100 and the bed 200 are locked in a corresponding manner on the opposite side, too. Moreover, in order to arrange a part of the side beams 202, 203 to the slots 143, 153, a corresponding part of each one of the side beams 202, 203 has a part, of which height is uniform. The height refers to a measure that is unidirectional with a normal of the plane of the bed 200. The term uniform refers to non-varying, i.e. constant. The corresponding part of the side beams 202, 203 refers to a part of the side beam starting from the bend point 232, 233 (respectively) and extending towards the front end $F_{200}$ of the bed 200 for some length, such as at least 10 cm. Thus, in an embodiment, the first side beam 202 has a uniform height at least from the first bend point 232 towards front end $F_{200}$ of the bed 200 for a distance of at least 10 cm and the second side beam 203 has a uniform height at least from the second bend point 233 towards front end $F_{200}$ for a distance of at least 10 cm. Preferably, the height of the first side beam 202 is constant in between the front end $F_{200}$ and the first bend point 232 and the height of the second side beam 203 is constant in between the front end $F_{200}$ and the second bend point 233. In such a case also the first parts 141, 151 of the foot arrangements 140, 150 may be provided with slots.

Moreover, in an embodiment of a system, a height of the primary slot 143 of the pallet 100 equals or is greater than a height of the first side beam 202 of the bed 200. Furthermore, a height of the secondary slot 153 of the pallet 100 equals or is greater than a height of the second side beam 203 of the bed 200. However, to minimize vertical movements during transportation, in an embodiment, a height of the primary slot 143 of the pallet 100 equals or is at most 25 mm greater than a height of the first side beam 202 of the bed 200. Preferably, a height of the primary slot 143 of the pallet 100 equals or is at most 10 mm greater than a height of the first side beam 202 of the bed 200. Furthermore, a height of the secondary slot 153 of the pallet 100 equals or is at most 25 mm greater than a height of the second side beam 203 of the bed 200. Preferably, a height of the secondary slot 153 of the pallet 100 equals or is at most 10 mm greater than a height of the second side beam 203 of the bed 200. However, the height of the slot 143, 153 is not less than the height of the corresponding side beam 202, 203 (respectively).

Referring to FIG. 4b, when loading the pallet 100 onto the bed 200 in such a system, at some point the pallet 100 moves in such a way that the part of the side beams 202, 203 of the bed become inserted into the slots 143, 153 of the pallet 100. Thus, the middle part of the pallet 100 is fixed in the vertical direction to the bed 200. Moreover, the front end of the pallet 100, which is shown in FIG. 4a, is fixed to the bed 200 by the means for grabbing the rod 102, e.g. the hook 211. Therefore, in such a case, the pallet 100 is fixed to the bed 200 at three points, whereby the pallet 100 is fixed in a study manner to the bed 200. This may be important when transporting the pallet 100. Thus, the first parts 141, 151 need not comprise slots, as depicted in FIG. 4a. In addition, this fixing take place automatically, since the locking of the hook may be automated, as discussed elsewhere, and the locking of the slots 143, 153 to the side beams 202, 203 is also automatic. This is especially beneficial in autonomous transportation systems.

As for some other aspects of the pallet 100, in an embodiment, the frame 110 is provided with at least a roll that protrudes on the second side of the plane P of the pallet 100. The roll or rolls diminish friction between the frame 110 of the pallet 100 and at least one of the side beams 202, 203.

Referring to FIG. 1d, in an embodiment, the primary side part 112 comprises an outer part 132a of a primary side profile and an inner part 132b of a primary side profile. In a similar manner, the secondary side part 113 comprises an outer part 133a of a secondary side profile and an inner part 133b of a secondary side profile. Concerning only the secondary side of the pallet 100, the parts 151, 152 of the secondary foot arrangement 150 may protrude from the inner part 133b of the secondary side profile (see FIG. 1d). As indicated above, the transversal profiles including the rod 102 and the middle rod 105 are configured to contact the second side beam 203 of the bed 200 during loading. This applies mutatis mutandis on the opposite, primary, side of the pallet 100, too. Thus, the primary foot arrangement 140 may protrude from the inner part 132b of the primary side profile (see FIG. 1d).

In order to provide a space in between the side parts 112, 113 and the base ("BASE"), the pallet comprises spacers. Such a spacers protrudes in the second side of the plane P of the pallet 100. As an example, the foot arrangements 140, 150, if sufficiently sturdy, may serve as the spacers. As an example, a wheel 120, 121 of the pallet 100 may serve as the spacer. However, a spacer, even if different from the foot arrangement 140, 150, need not comprise a wheel. The spacers are configured to contact a base ("BASE" in FIG. 3a), such as a floor or a road, when the pallet 100 is arranged on the base. The pallet 100 may thus easily be lifted by arranging a device, such as a forklift, into the space in between the base ("BASE") and the plane P of the pallet 100. Such a device may be applied under the side profiles 132, 133 of the pallet 100, Thus, the device may support the pallet 100 in a similar manner as the side beams 202, 203 of the bed 200 support the pallet 100.

Preferably, the first part 141 of the primary foot arrangement 140 and the first part 151 of the secondary foot arrangement 150 are arranged in between a primary front spacer and a secondary front spacer of the pallet 100. The primary front spacer is arranged at the primary side profile 132 (e.g. at an outer part 132a of the side profile, as in FIG. 1d, wherein the wheel 120 serves as the support) and at the front end $F_{100}$ of the pallet 100; and the secondary front spacer arranged at the secondary side profile 133 (e.g. at an outer part 133a of the side profile, as in FIG. 1d, wherein a wheel serves as the support) and at the front end $F_{100}$ of the pallet 100. The spacers have the function of protecting the foot arrangements 140, 150 at least when the load on the pallet 100 is heavy. However, a spacer may form a part of a foot arrangement. Or, conversely, the foot arrangements 140, 150 may serve as the spacers. A height of a spacer is preferably from 80 mm to 200 mm, more preferably from 90 mm to 120 mm, such as 100 mm. The height is measurable from a bottom part of the side profile 132, 133 from which the spacer extends.

For the last mile operation, the pallet 100 is preferably provided with wheels. Thus, an embodiment of the pallet 100 comprises wheels 120, 121. The wheels are arranged on the second side of the plane P of the pallet 100. Moreover, the wheels are configured to contact a base ("BASE" in FIG. 3a), such as a floor or a road, when the pallet 100 is arranged on the base. The pallet 100 may thus easily be moved on the base on the wheels 120, 121.

The wheels are provided at such a location that the wheel protrudes from the plane P of the pallet 100 a height $H_{120}$ (FIG. 1d) of the wheel. The height of the wheel may be from 80 mm to 200 mm, more preferably from 90 mm to 120 mm, such as 100 mm. Correspondingly, a height $H_F$ (FIG. 1d) of the parts 141, 142, 151, 152 of the foot arrangements 140, 150 is less than the height $H_{120}$ of the wheels in order for the wheels 120, 121 to function.

Figure 6A:
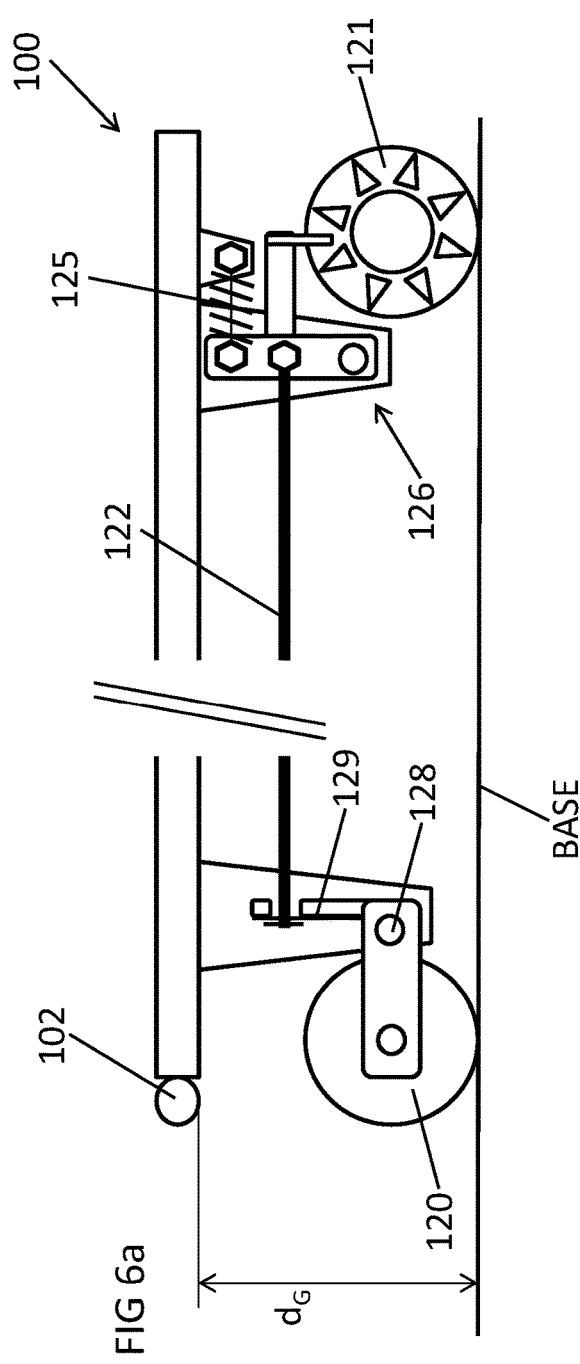
FIG. 6a shows a pallet having a brake, wherein the brake is in a closed position.

Preferably, the pallet 100 is configured by the supports, which optionally comprise wheels, and/or by the foot arrangements 140, 150 in such a way that a distance $d_G$ of 50 mm to 150 mm, preferably from 90 mm to 110 mm, such as 100 mm (one significant digit), is configured to be left in between the rod 102 and a flat base "BASE", when the pallet 100 as arranged on the flat base "BASE". The distance $d_G$ is shown in FIG. 6a. Moreover, preferably the distance between a flat part of the frame 110, e.g. transversal rods of the frame 110, equals the distance $d_G$. This has the effect sufficient space is left on one hand in between the base "BASE" and the rod 102 and on the other hand in between the base "BASE" and the flat part of the frame 110 for a forklift. The height 100 mm corresponds to a similar height of a standardized EUR pallet.

Preferably, the pallet 100 comprises a primary front wheel 120 arranged at the primary side part 112 (e.g. at the primary side profile 132) and at the front end $F_{100}$ of the pallet 100, a primary rear wheel 121 arranged at the primary side part 113 (e.g. at the primary side profile 132) and at the rear end $R_{100}$ of the pallet 100, a secondary front wheel 120b arranged at the secondary side part 113 (e.g. at the secondary side profile 133) and at the front end $F_{100}$ of the pallet 100, and a secondary rear wheel 121b arranged at the secondary side part 113 (e.g. at the secondary side profile 133) and at the rear end $R_{100}$ of the pallet 100. This has the effect that the pallet is manually usable for last mile operations. Moreover, not having e.g. a central wheel makes it possible to load the pallet 100 onto the bed 200 as described later.

However, the wheels 120, 121 may be fixed to the outer pats 132a, 133a of the side parts 112, 113, as indicated in FIG. 1d. This has the effect that the wheels 120, 121 do not come into way when loading the pallet 100 onto the bed 200. Therefore, in an embodiment, a part of a foot arrangement 140, 150 is arranged in between a wheel 120, 121 of the pallet 100 and a longitudinal central axis $AX_{L100}$ of the pallet 100. In an embodiment, the first part 141 of the primary foot arrangement 140 and the first part 151 of the secondary foot arrangement 150 are arranged in between a primary front wheel 120 and a secondary front wheel 120b of the pallet 100. The primary front wheel 120a is arranged at the primary side part 112 and at the front end $F_{100}$ of the pallet 100; and the secondary front wheel 120b arranged at the secondary side part 113 and at the front end $F_{100}$ of the pallet 100 (see FIG. 1d).

As known, a wheel 120, 121 of the pallet is rotatable about an axis that is unidirectional with a width of the pallet 100. Preferably, at least one of the wheels is rotatable also about an axis that is unidirectional with a normal of the plane P of the pallet 100. More preferably at least one of [A] the primary front wheel 120 and the secondary front wheel 120b and [B] the primary rear wheel 121 and the secondary rear wheel 121b are rotatable about an axis that is unidirectional with the normal of the plane P of the pallet 100. Even more preferably, at least the primary front wheel 120 and the secondary front wheel 120b are rotatable about an axis that is unidirectional with the normal of the plane P of the pallet 100. This helps the transversal movement of the front end of the pallet 100 during loading.

Referring to FIG. 1a, for the last mile manual operation, an embodiment of the pallet 100 comprises a handle 106 for manually handling the pallet 100. Preferably, the handle 106 is arranged at a suitable high level for reasons of ergonomics. Thus, preferably, the handle 106 is arranged on the first side of the plane P of the pallet 100 and a distance between the handle 106 and the plane P of the pallet 100 is at least 50 cm. It is noted that the pallet 100 is configured to receive goods on the first side of the plane P of the pallet 100, as indicated in FIG. 1a.

Figure 6B:
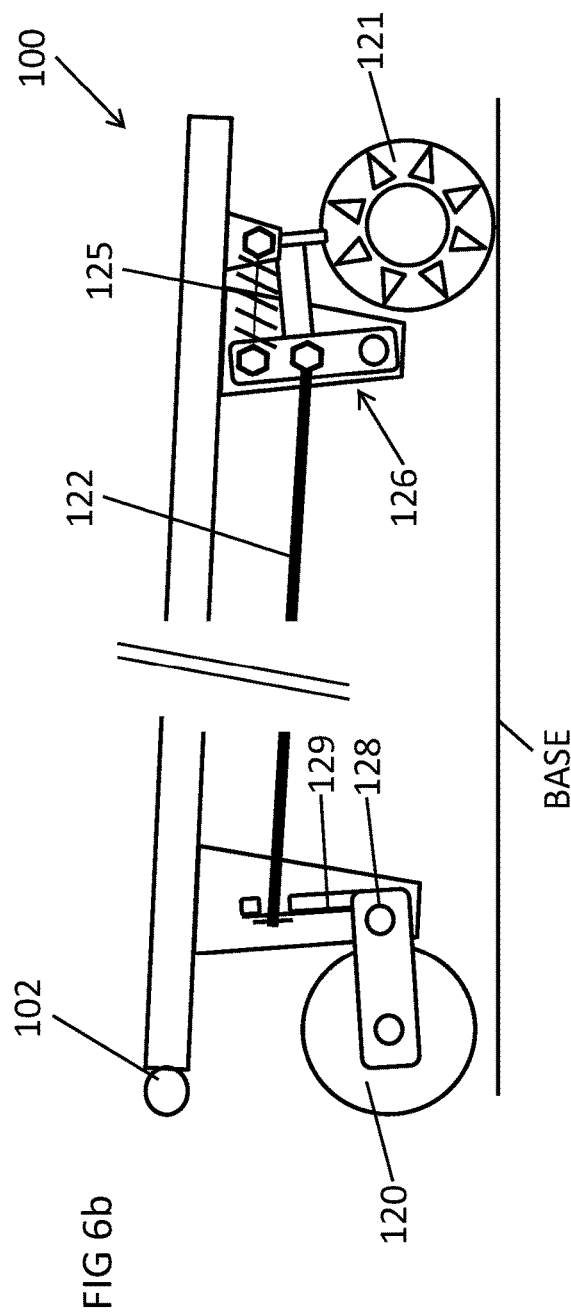
FIG. 6b shows a pallet having a brake, wherein the brake is in an open position.

When the pallet 100 comprises wheels 120, 121, the pallet preferably comprises a brake 126. A brake 126 is schematically shown in FIGS. 6a and 6b. The brake 126 is configured to be in an open position (as in FIG. 6b) and a closed position (as in FIG. 6a), wherein in the closed position, the brake 126 is configured to retard or prevent rotation of at least one of the wheels (120, 121) of the pallet 100 and in the open position, the wheels (120, 121) of the pallet 100 are configured to rotate freely.

When the pallet 100 comprises the brake 126, the pallet preferably comprises a brake handle 127, as depicted in FIG. 1a. The brake handle 127 is configured in such a way that by the brake handle 127, an operator of the pallet 100 is able to turn the brake 126 from the open position to the closed position and from the closed position to the open position. For example, the pallet 100 may be configured such that the brake turns automatically to the closed position, and the used may use the handle to turn the brake to an open position at least for the time the pallet 100 is manually operated.

Moreover, in an embodiment, the pallet 100 may be configured such that the brake 126 is configured to turn from the closed to the open position, when the front end $F_{100}$ of the pallet is lifted. Thus, the brake 126 may turn off automatically upon loading the pallet to the bed 200 is described below. Moreover, the brake handle 127 can be used to open and close the brake 126. The brake handle 127 needs not be integrated with the handle 106. The pallet 100 may comprise a brake handle even if it does not comprise such a handle that has been described above. For example a brake handle 127 may be arranged closer to the plane P of the pallet than the aforementioned preferable distance for the handle 106.

Figure 6C:
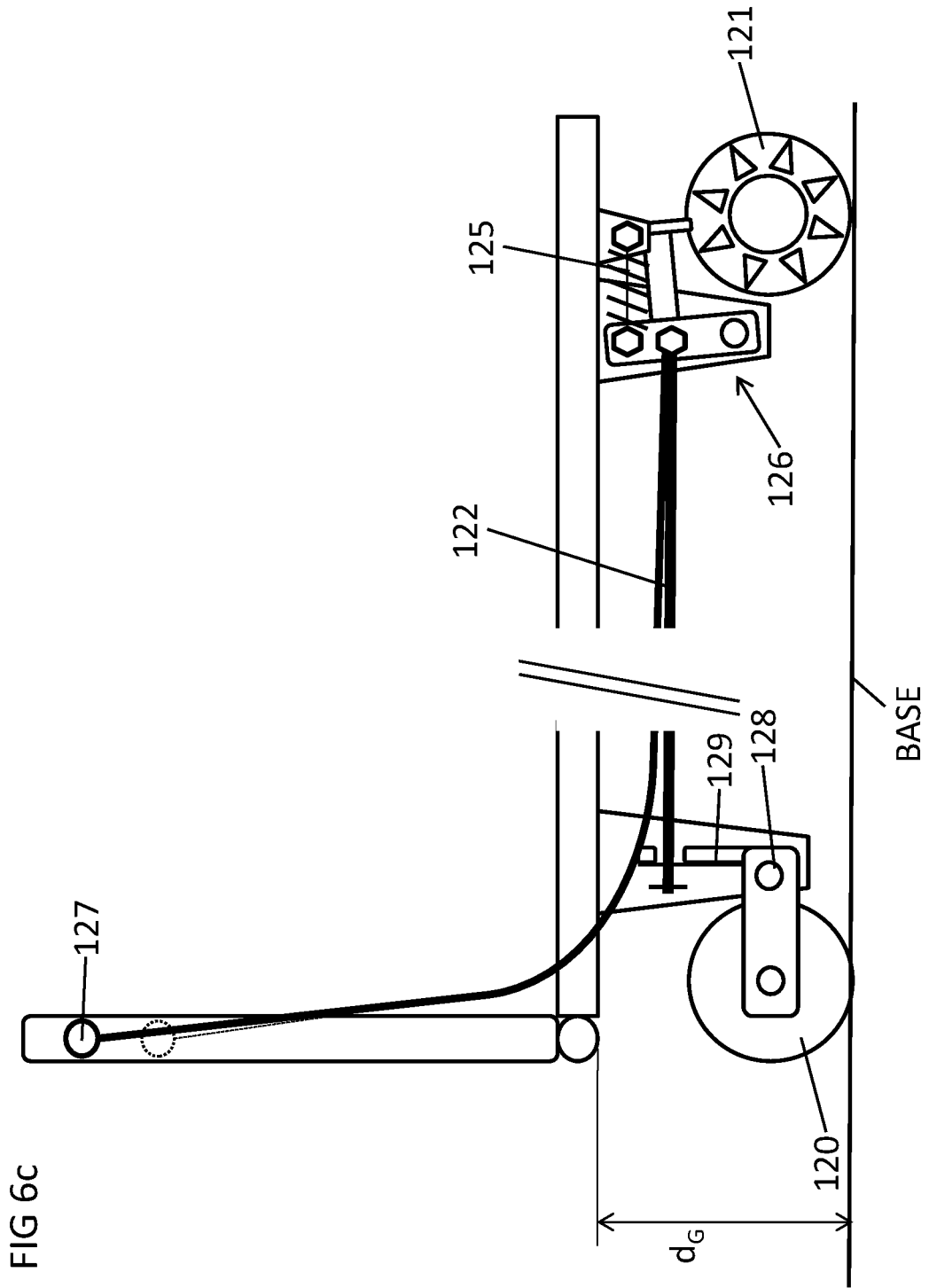
FIG. 6c shows a pallet having a brake, wherein the brake is in an open position.

With reference to FIGS. 6a and 6b, the front wheels 120 and the rear wheel 121 may be connected by a longitudinal rod 122. Moreover, the front wheel may be pivotable about an axis 128 is such a manner that raising the front wheel from the base "BASE", e.g. from the rod 102, forces the longitudinal rod 122 to move at least in the longitudinal direction. For example, then the front wheel 120 is lifted as in FIG. 6b, a gravitational force action on the front wheel 120 causes an L-shaped member to pivot about the axle 128. The pivoting of the L-shaped member causes an upper part of the L-shaped member 129 to move forward, and when it is connected to the longitudinal rod 122, to pull the longitudinal rod forward. As indicated in FIG. 6b, the longitudinal rod 122 may be connected to the brake 126 in such a manner, that the brake turns to the open position. However, when also the front end $F_{100}$ the pallet 100 is arranged on the base, the brake 126 may be in the closed position, as indicated in FIG. 6a. For example a spring 125 may pull the brake 126 to the closed position. Referring to FIG. 6c, even when the also the front end $F_{100}$ the pallet 100 is arranged on the base, the brake may be in the open position, since the longitudinal bar 122 may move frontwards relative to the L-shaped member 129 even when the front wheel 120 remains on the base. Thus, by using the brake handle 127, the user may e.g. pull the rod 122 frontwards, thereby opening the brake 126.

By releasing the brake handle 127, the spring 125 can close the brake 126. Thus, the manual brake handle 127 can be applied simultaneously with the automatic mechanism described above.

The pallet 100 needs not to be configured for manual handling. In such a case wheels 120, 121 are not needed. In case the pallet does not comprise wheel, the brake is not needed. However, as detailed below, the wheels 120, 121, in particular the rear wheels 121, 121b, which are arranged at the rear end $R_{100}$ of the pallet 100, may help loading of the pallet 100 onto the bed 200. A pallet 100 with or without wheels may be moved e.g. by a forklift 500. However, when a forklift 500 is used, the primary foot arrangement 140 and/or the secondary foot arrangement 150 may prevent applying the fork of the forklift under the pallet 100. In case the pallet 100 comprises only rear wheels, a brake 126 is not needed.

For this reason, and with reference to FIGS. 4c and 4d, in an embodiment, the pallet 100 is provided with a primary articulation 113. The primary articulation 113 is arranged such that at least one of the first part 141 and the second part 142 of the primary foot arrangement 140 is pivotable relative to the plane P of the pallet about an axis that is unidirectional with a length of the pallet 100 at the articulation point of the primary articulation 113. In addition or alternatively (preferably in addition), the pallet 100 is provided with a secondary articulation. The secondary articulation is for a similar reason regarding the secondary foot arrangement 150. Thus, the secondary articulation is arranged such that at least one of the first part 151 and the second part 152 of the secondary foot arrangement 150 is pivotable relative to the plane P of the pallet about an axis that is unidirectional with a length pallet 100 at the articulation point of the secondary articulation. In this way, as indicated in FIG. 4d, the primary foot arrangement 140 and/or the secondary foot arrangement 150 may move away from the forklift 500 by turning relative to the plane P of the pallet.

However, if the foot arrangement (140 and/or 150) turns relative to the plane P, the centering and/or aligning function thereof may be lost. Thus, in case the pallet 100 comprises the primary articulation 133, the pallet 100 preferably comprises a primary spring 115. The primary spring 115 is configured to turn the at least one of the first part 141 and the second part 142 of the primary foot arrangement 140 back to its original position. More specifically, the primary spring 115 is configured to turn the at least one of the first part 141 and the second part 142 of the primary foot arrangement 140 towards such a position in which the at least one of the first part 141 and the second part 142 of the primary foot arrangement protrudes in the direction of normal of the plane P of the pallet 100 on the second side of the plane P of the pallet 100, as indicated in FIG. 4c. In case the pallet 100 comprises the secondary articulation, the pallet 100 preferably comprises a secondary spring configured to return the part or parts 151, 152 of the secondary foot arrangement 150 to the original position as discussed in more detail for the primary articulation mutatis *mutandis*.

For improving autonomous use of the pallet 100, the pallet may comprise various sensors or detectors. In particular, the pallet 100 may comprise a microchip configured to detect a location of the pallet 100. A sensor may be energetically passive, i.e. function without an electric source that converts chemical energy to electricity. In such a case energy may be harvested from the environment. Examples include Radio Frequency Identification (RFID) techniques. Thus, in an embodiment, the pallet 100 comprises equipment for radio frequency identification (RFID). The equipment for RFID may comprise e.g. an RFID tag.

In case the pallet 100 is used in an Internet Of Things (IOT) application (or similar) communication between the pallet 100 and another entity may be required. The other entity may be the transport device 400. For these reasons, in an embodiment, the pallet 100 comprises a radio frequency communication circuit and an energy source configured to provide electricity to the radio frequency communication circuit. The energy source may be configured to convert chemical energy to electricity. The energy source may comprise a battery, such as a rechargeable battery.

Optionally the pallet 100 may be provided with a floor. The floor may improve handling of small goods. The floor may be arranged on the side profiles 132, 133 on the first side of the plane P. The pallet 100 may be provided with a floor and walls. This may improve the use of the pallet 100, when a lot of goods are to be transported. The pallet 100 may be provided with floor, walls, and ceiling. An intermodular container may be arranged on the plane P of the pallet 100 to receive the goods.

Examples of goods that can be arranged on the pallet 100, e.g. on a floor of the pallet include:
  an autonomous mailbox to deliver mail or parcels to recipients,
  a movable sanitary facility,
  a recycle bin,
  a portable telecommunication link, and
  a work machine.

As for some aspects of the transport device 400, in an embodiment, the first side beam 202 of the bed 200 of the transport device 400 is provided with at least a roll, which is configured to contact the frame 110 of the pallet 100 when loading a pallet 100 onto the bed 200. Also the second side beam 203 of the bed 200 may be provided with a roll, which is configured to contact the frame 110 of the pallet 100 when loading a pallet 100 onto the bed 200. Such a roll or rolls reduce friction in between the pallet 100 and the bed 200, which may be beneficial.

Loading the pallet 100 onto the bed 200, in particular the smooth operation of the foot arrangements 140, 150 of the pallet 100 and the side beams 202, 203 of the bed 200, may be affected by the shape of ground. For example, when the ground is highly non-planar, the planes of the pallet 100 and the bed 200 be at a relatively high angle relative to each other. Referring to FIGS. 4a and 4b, for such a case it may be feasible that the transport device comprises a third articulation 243. Thus, in an embodiment, the transport device 400 comprises a third articulation 243 for turning the bed 200 relative to the chassis 300 about an axis that is unidirectional with the direction $DL_{300}$ of length for the chassis 300 or about an axis that is unidirectional with a length of the bed 200. As for the term direction of length of the chassis 300, what has been said above applies.

When the transport device comprises the three articulations 241, 242, 243, they may be implemented by using a single ball joint. Thus, the transport device 400 may comprise a ball joint for turning the bed relative to the chassis 300 about three axles, which span a three-dimensional space. Examples of such axles have been discussed above in connection with the first, second, and third articulations 241, 242, and 243, respectively. In general, a ball joint allows free turning in two planes, including rotating in those planes, at the same time while preventing translation in any direction.

Figure 2C:
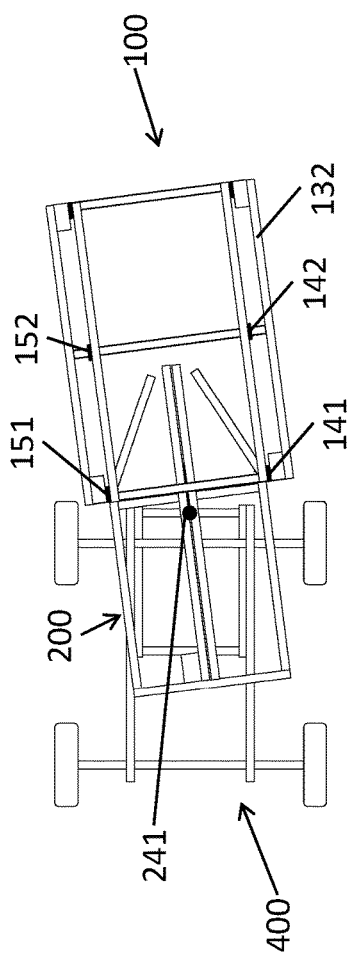
Figure 2D:
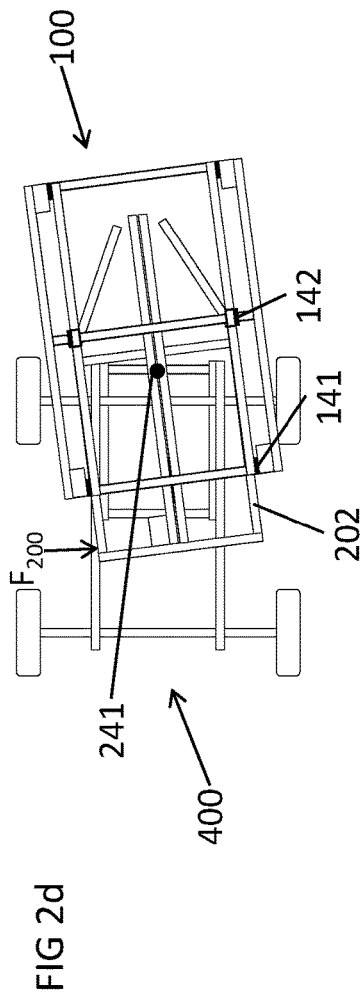
Figure 2E:
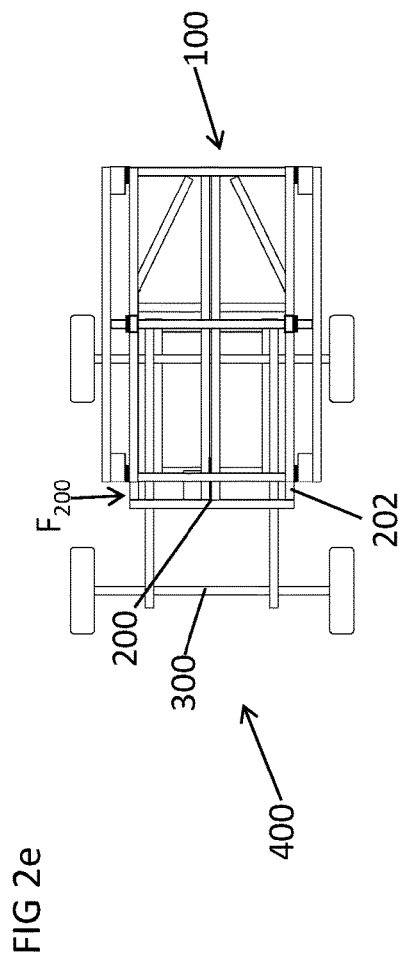
Figure 2F:
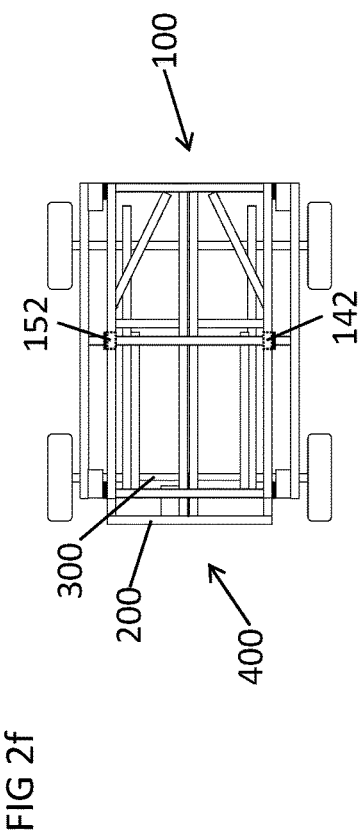

In an embodiment, the bed 200 is movable back and forth relative to the chassis 300, as indicated e.g. in FIGS. 2e and 2f. This allows for adjusting a mass distribution of the transport device 400 when loaded with the pallet 100. This may be important, if heavy goods are transported. Thus, in an embodiment, the bed 200 is movable relative to the chassis 300 by translation. In other words, the bed 200 is movable relative to the chassis 300 in such a way that a centre of the bed 200 moves relative to a centre of the chassis 300 and at the same time an angle between a normal of the plane of the bed 200 and a normal of the plane of the chassis 300 does not change. In other words, the movement back and forth does not relate to the movements generated by the articulation 241 and 242 and optionally also 243.

Figure 3A:
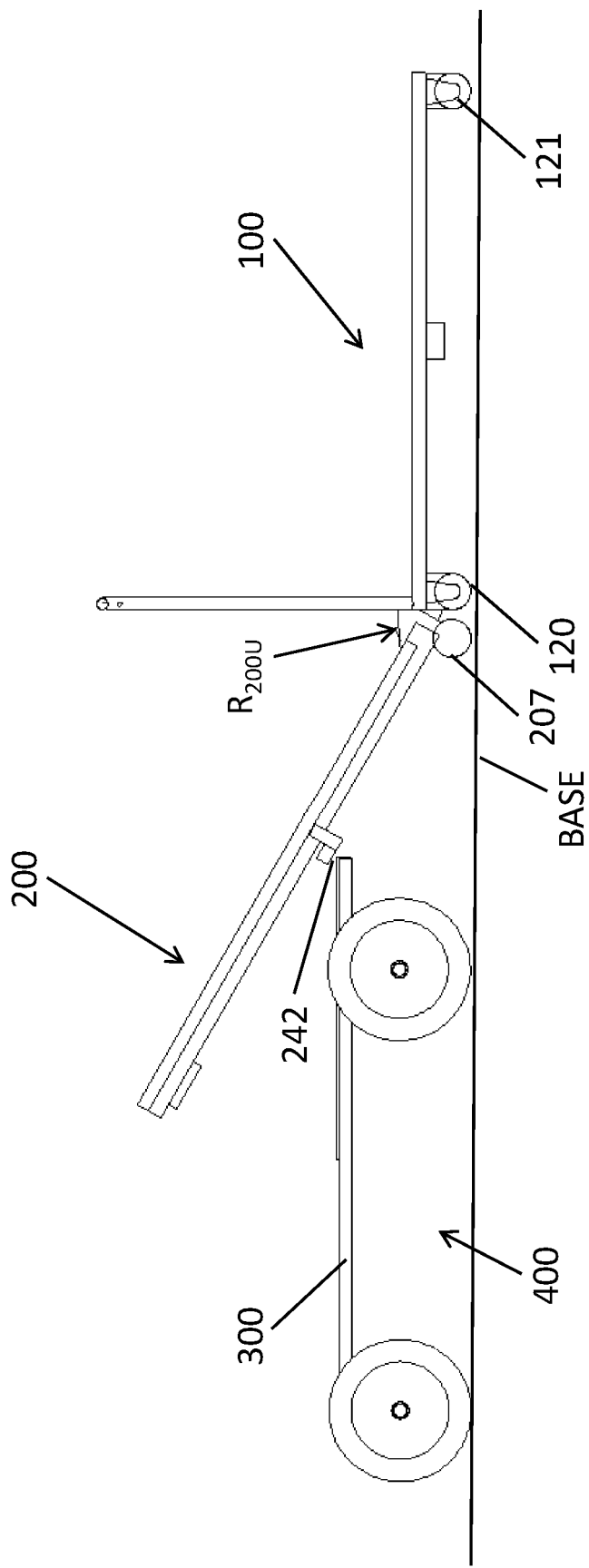
FIG. 3a to 3f show, in a side view, loading or unloading a pallet to/from a transport device.
Figure 3B:
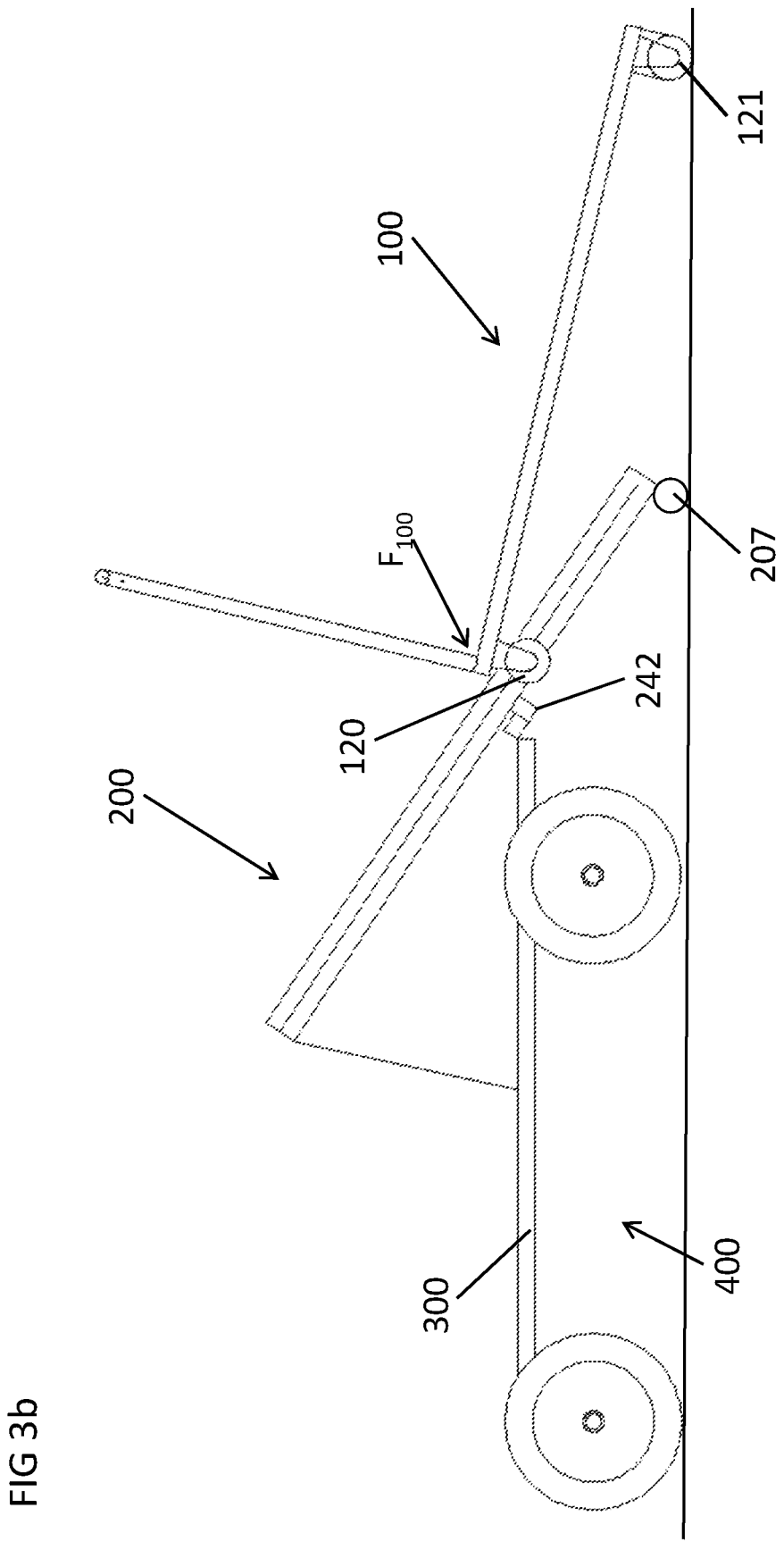

When the bed 200 is movable relative to the chassis in such a manner, preferably the bed 200 is provided with a sliding means, such as a wheel 207 or a gliding plane, that is arranged at the rear end $R_{200}$ of the bed 200, as depicted in FIGS. 3a and 3b. In such a case, when unloading the pallet 100, if the ultimate rear end $R_{200U}$ of bed 200 contacts a base ("BASE" in FIG. 3a), the bed 200 can still be relatively easily moved rearwards because of the sliding means, such as the wheel 207. This applies also for loading the pallet 100 mutatis *mutandis*. Therefore, in an embodiment, the transport device 400 comprises a sliding means arranged at the ultimate rear end $R_{200U}$ of the bed 200. The sliding means is configured to contact a base ("BASE"), such as a floor or a road, at least when starting to load a pallet 100. The sliding means, such as the wheel 207, also helps to detach the transport device 400 from the pallet 100 after unloading the pallet 100. Thus, the transport device 400 may be easily driven, relative to the pallet 100 and detached therefor, such that the bed 200 is tilted, and the gliding means contacts the base "BASE". When the transport device 400 and the pallet are fully separated, the bed can be un-tilted to a horizontal position, e.g. by moving the carrier 210 to the front end $F_{200}$ of the bed (without loading a pallet or by loading another pallet).

In an embodiment, the a loading and unloading arrangement 206 is configured to grab such a rod 102 of a pallet 100 that is arranged a distance of 50 mm to 150 mm, preferably from 90 mm to 110 mm, such as 100 mm (one significant digit) from a flat base "BASE", when the transport device is on the flat base "BASE". This has the effect, that when the measures of the pallet 100 are designed to conform with a standard EUR pallet, the transport device 400 is configured to grab such a pallet 100. In case the loading and unloading arrangement 206 comprises the sliding means (e.g. the wheel 207), the location and size of the sliding means affects the height, from which the grabbing means of the loading and unloading arrangement 206 is configured to grab the rod 102. In case the loading and unloading arrangement 206 does not comprise the sliding means, the dimensions of the loading and unloading arrangement 206 may be selected accordingly.

For improving autonomous use of the transport device 400, the transport device may comprise various sensor or detectors. In an embodiment, the transport device 400 comprises a first sensor. The first sensor may be configured to detect at least one of an angle between the plane of the bed 200 and the plane of the chassis 300,
a distance between a centre of the bed 200 and a centre of the chassis 300, and
a position of a pallet 100 arranged on the bed 200.

In addition or alternatively, the transport device 400 may comprise a microchip configured to detect a location of the transport device 400. Such information may be used to control the loading process, the unloading process, and/or a position of the bed 200 relative to the cassis 300. Such control may be important in autonomous transport systems.

In case the transport device 400 is used in an Internet Of Things (IoT) application (or similar) communication between the pallet transport device and another entity may be required. The other entity may be the pallet 100. For these reasons, in an embodiment, the transport device 400 comprises a radio frequency communication circuit and an energy source configured to provide electricity to the radio frequency communication circuit. The energy source may be configured to convert chemical energy to electricity. The energy source may comprise a battery, such as a rechargeable battery. The same energy source may be used for powering the loading and unloading arrangement 206 and the radio communication circuit of the transport device 400.

In a preferable embodiment of a system, both the pallet 100 and the transport device 400 comprise a microchip configured to detect a location of the pallet 100 and the transport device 400, respectively. In a preferable embodiment of a system, both the pallet 100 and the transport device 400 comprise a radio frequency communication circuit and an energy source configured to provide electricity to the radio frequency communication circuit. In this way, the transport device 400 is able to detect a location of the pallet 100 relative to the transport device, whereby pick-up and loading of the pallet 100 onto the transport device 400 can be automated.

FIGS. 1c, 2a to 2f, and 3a to 3f show a system for transporting goods. The system comprises a pallet 100 (as described above or below) and a transport device 400 (as described above or below). Referring to FIG. 2a to 2f, and 3a to 3f loading of the pallet 100 onto the bed 200 may take place as follows: As indicated in FIGS. 2a and 3a, the transport device 400 may first be moved close to the pallet 100 in such a way that the rear end $R_{200}$ or the ultimate rear end $R_{200U}$ of the bed 200 is close to the rod 102 of the pallet. The loading and unloading arrangement 206 and the pallet 100 may be dimensioned such that, as the bed 200 is tilted, and the carrier 210 is at the ultimate read end $R_{200U}$ of the bed 200, the grabbing means, such as the hook 211 can be pushed below the rod 102 to a position under the frame 110 of the pallet 100. In case the bed 200 is movable relative to the chassis 300, the bed 200 may be moved to a rearmost position. The bed 200 may be tilted relative to the chassis 300 because of the second articulation 242, as indicated in FIG. 3a. If needed the transport device 400 may be provided with a spring or similar to tilt the bed 200 relative to the chassis 300. The grabbing means, such as the hook 211, may be fixed to the rod 102. Preferably, the grabbing means, such as the hook 211, is automatically fixed to the rod. For example, since the bed is tilted, moving the carrier 210 forwards may lift the carrier 210 to such an extent that the hook 211 automatically grabs the rod, i.e. is fixed thereto, as the carrier 210 is moved forward. After fixing the loading and unloading means 206 to the rod 102, the pallet 100 can be loaded, e.g. by moving the carrier 210 (further) forward.

Thereafter, the pallet 100 may be loaded onto the bed 200 by pulling from the rod 102. Referring to FIG. 2b, at some point the first part (141, 151) of the first or the second foot arrangement (140, 150) contacts a side beam (202, 203) of the bed 200. Referring to FIG. 2c, when the pallet 100 is further pulled onto the bed, the bed 200 may turn relative to the chassis 300 about an axle that is unidirectional with a normal of the plane of the bed 200 or unidirectional with a normal of the plane of the chassis 300 because of the first articulation 241. Moreover, because of the pulling also the pallet 100 may turn about an axis that is unidirectional with the normal of the plane P of the pallet 100. Referring to FIG. 3b, as a result of the pulling and the tilted bed 200, the front end $F_{100}$ of the pallet 100 rises at least to some extent. Moreover, a rear wheel 121 of the pallet 100 helps the loading of the pallet, since the pallet 100 is pulled. As detailed above, a brake 126 of the pallet 100 may be configured to turn off as a result of lifting the front end $F_{100}$ of the pallet. This is depicted in FIG. 6b.

Figure 3C:
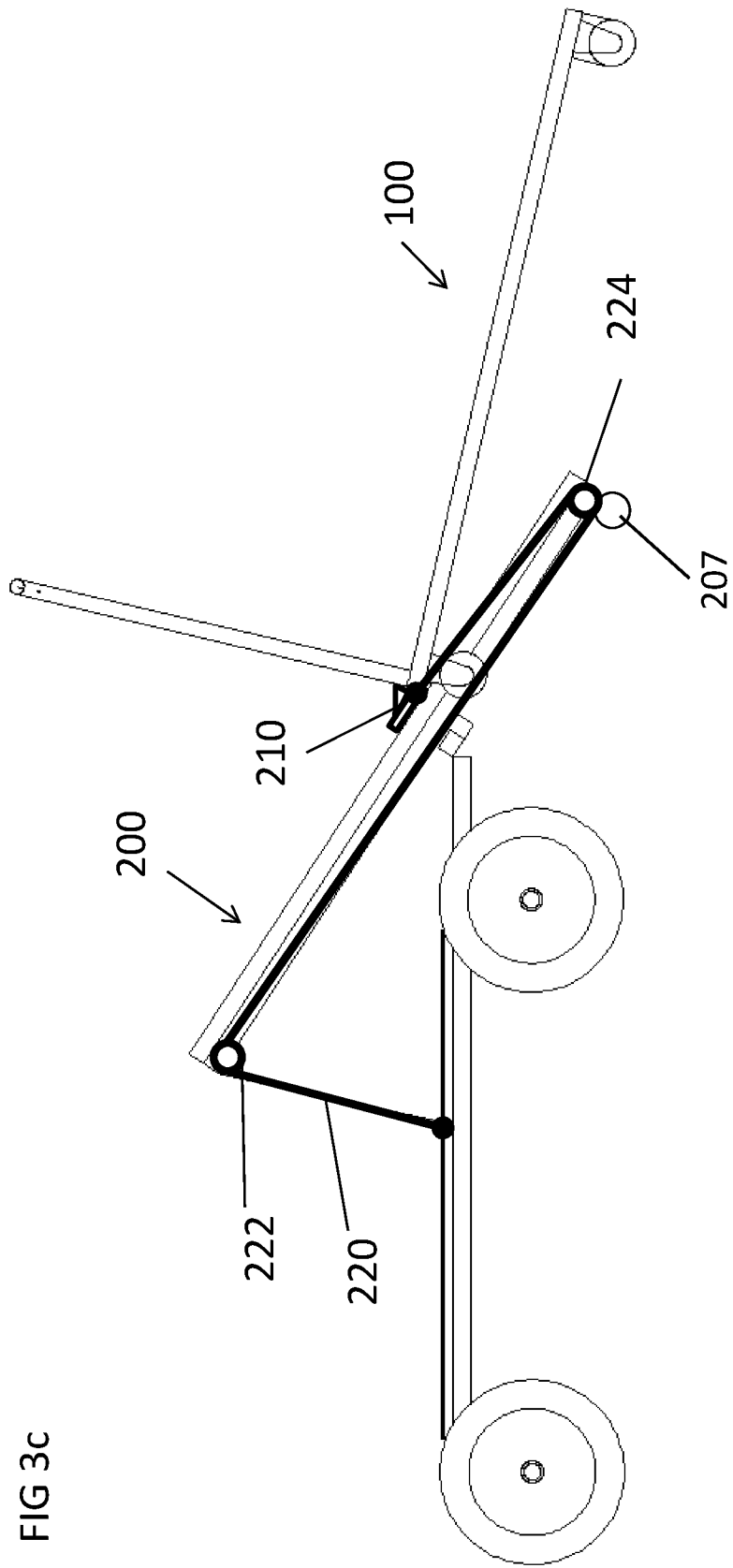

Referring to 3e, at some point the bed 200 may turn back to a position, in which it is not tilted. Referring to FIG. 3c in order to ensure that the bed 200 becomes substantially horizontal, when the pallet 100 is loaded in the front $F_{200}$ of the bed 200, the transport device 400 may comprise a rope or a cable 220. One end of the rope or the cable 220 is fixed to the chassis 300 and the other end of the rope or the cable 220 is fixed to the carrier 210. Moreover, the rope or cable 220 runs in between the ends thereof such that it goes round a rear roll 224 and a front roll 222. The rear roll 244 is arranged at the rear end $R_{200}$ of the bed and the front roll 222 is arranged at the front end $F_{200}$ of the bed 200. In this way, when loading the pallet 100, the carrier 210 moves frontwards (i.e. to the left in FIG. 3c), thereby tightening the rope or the cable 220. As the rope or the cable 220 tightens, it pulls the front end $F_{200}$ of the bed towards that point of the chassis, to which the rope or the cable 220 is fixed, because of the front roll 222. It is noted that in this way, the rope or the cable 220 not only aligns the bed 200 to be substantially horizontal (i.e. removes the tilt), but also aligns the longitudinal directions of the chassis 300 and the bed 200 to be unidirectional. This happens at least when the rope or cable 220 is fixed to a longitudinal central axis of the chassis 300 and the front roll 222 is arranged at a longitudinal central axis of the bed 200. If needed, a spring or similar may be provided to tilt the bed 200 relative to the chassis 300.

Figure 3D:
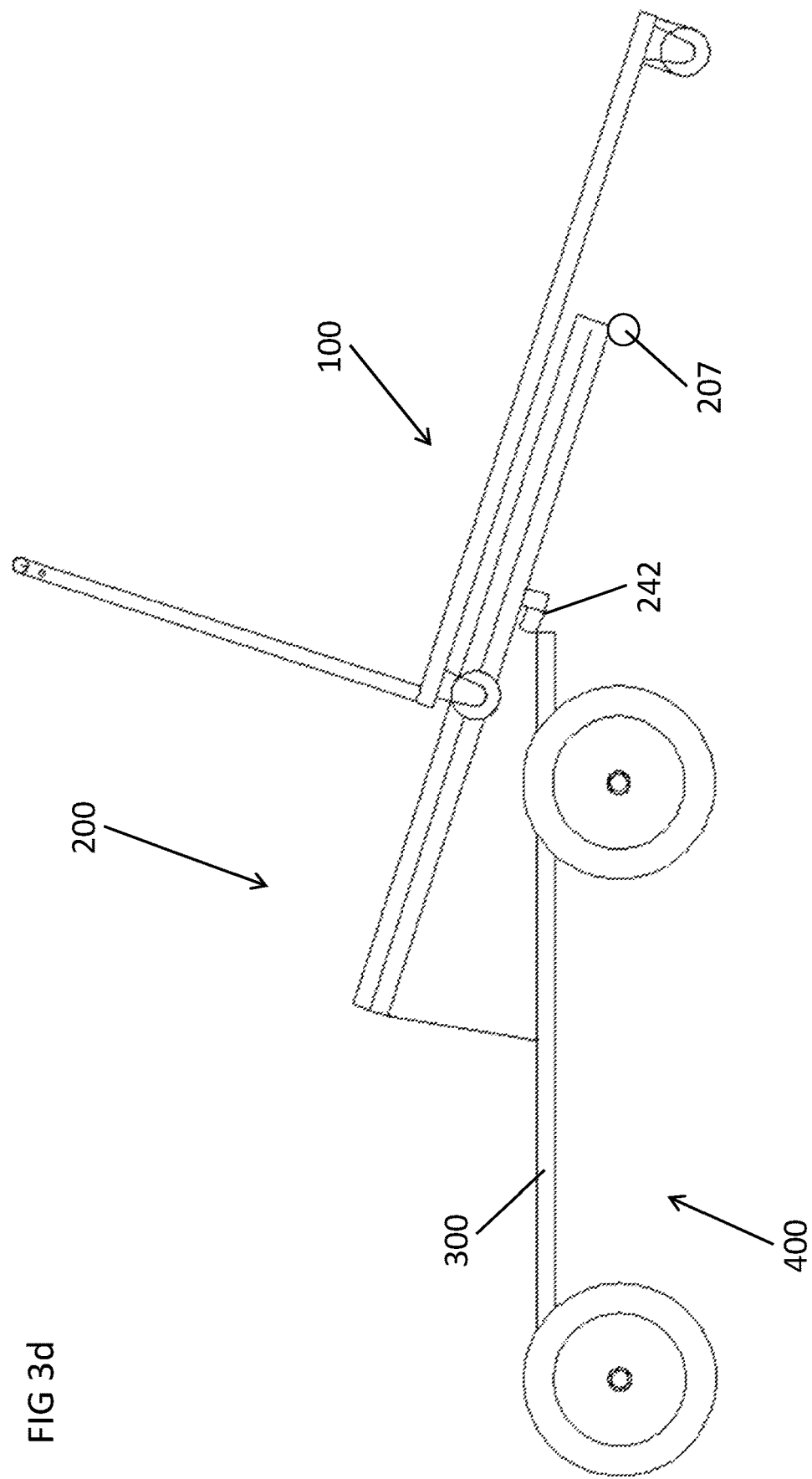

Referring to FIG. 2d, the pallet 100 may be further pulled towards the front end $F_{200}$ of the bed 200. Referring to FIG. 3d, at some point, the pallet 100 and the bed 200 are arranged relative to each other in such a way that the normals or their planes are unidirectional. In such a case, the slots 143, 153 of the foot arrangements 140, 150 may engage with the side beams 202, 203 of the bed 200, as detailed above and in FIG. 4b.

Figure 3E:
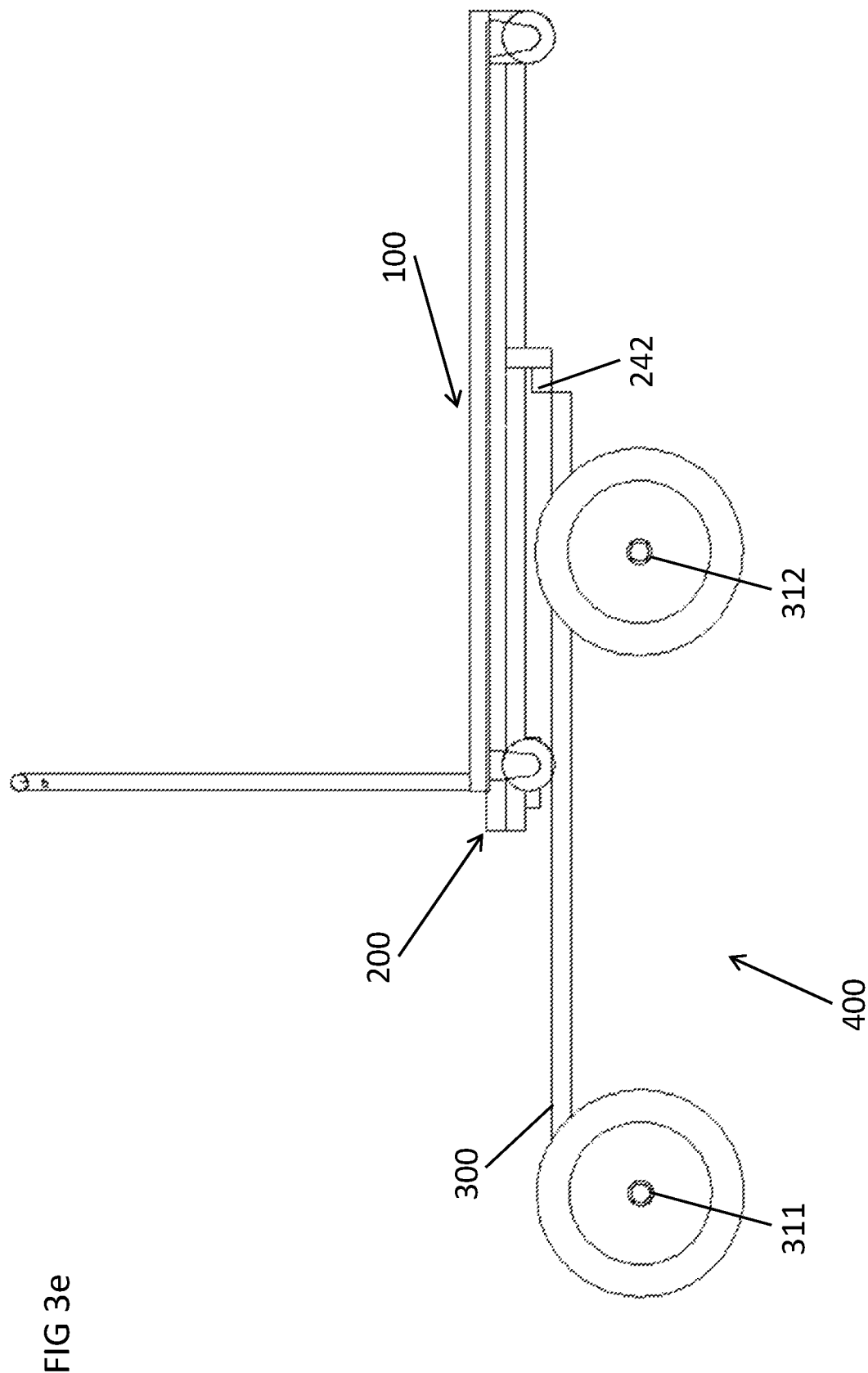

Referring to FIG. 2e, the pallet 100 may be further pulled forward up to the front end $F_{200}$ of the bed 200. Referring to FIG. 3d, at some point, the pallet 100 and the bed 200 are arranged relative to each other in such a way that the normal or their planes are unidirectional. Moreover, the bed may be turned, because of the first articulation 241 in such a way that the direction of the length of the bed 200 is unidirectional with a direction of length of the chassis 300. The turning may be done manually, or by using the rope or the cable 220 as indicated above. Referring to FIG. 3e, the bed 200 together with the pallet 100 may turn back to a position, in which it is not tilted. In other words, a normal of the plane of the bed is unidirectional with a normal of a plane defined by the axles 311, 312 of the chassis 300. The bed may turn in such a manner because of the second articulation 242.

Figure 3F:
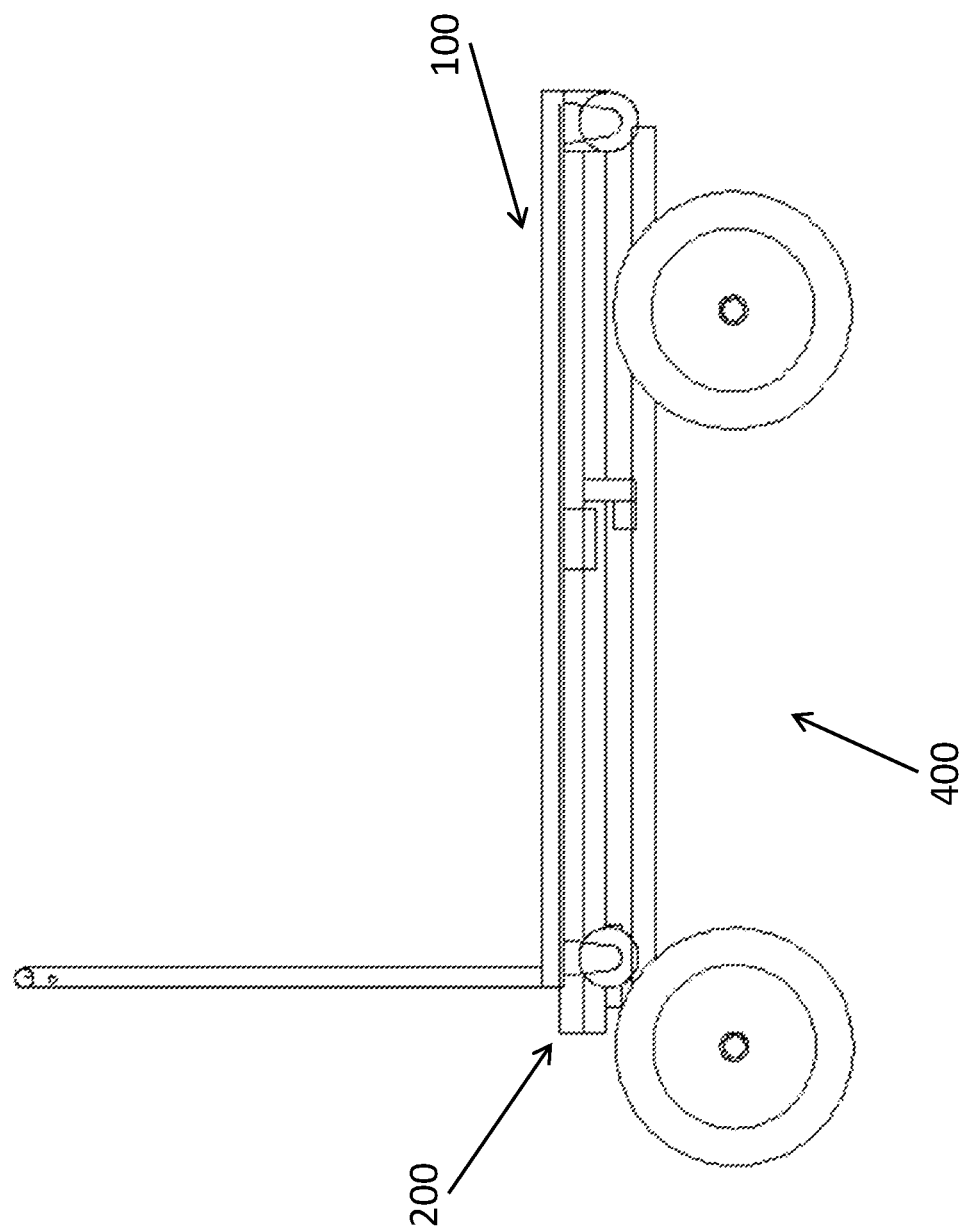

Referring to FIGS. 2f and 3f, thereafter, the bed 200 together with the pallet 100 may be moved, if needed, towards a front end of the chassis 300 for example in order to balance a load in between the axles 311 and 312 of the chassis.

Unloading of the pallet 100 may be done in a reverse order.

The claimed invention will be presented after some examples. The following examples summarize the embodiments disclosed above.

101. A pallet (100), comprising a frame (110) having a primary side part (112) and secondary side part (113), which is opposite to the first side part (112), the frame (110) defining a front end ($F_{100}$) of the pallet (100), a rear end (Rico) of the pallet (100), and a plane (P) of the pallet (100) such that the pallet (P) is configured to receive goods on a first side of the plane (P) of the pallet (100), a rod (102) that extends from the primary side part (112) to the secondary side part (113), wherein a distance between the rod (102) and the front end ($F_{100}$) is at most one fourth of the length ($L_{100}$) of the pallet (100), a primary foot arrangement (140) at the primary side part (112), the primary foot arrangement (140) comprising a first part (141) and a second part (142), wherein the first part (141) of the primary foot arrangement (140) protrudes in the direction of normal of the plane (P) of the pallet (100) on a second side of the plane (P) of the pallet, which second side of the plane (P) of the pallet is opposite to the first side of the plane (P) of the pallet (100), a distance between the first part (141) of the primary foot arrangement (140) and the front end ($F_{100}$) is at most 20% of the length ($L_{100}$) of the pallet (100), the second part (142) of the primary foot arrangement (140) protrudes in the direction of normal of the plane (P) of the pallet (100) on the second side of the plane (P) of the pallet (100), and a distance between the second part (142) of the primary foot arrangement (140) and the front end ($F_{100}$) is from 30% to 70% of the length ($L_{100}$) of the pallet (100) and a secondary foot arrangement (150) at the secondary side part (113), the secondary foot arrangement (150) comprising a first part (151) and a second part (152), wherein the first part (151) of the secondary foot arrangement (150) protrudes in the direction of normal of the plane (P) of the pallet (100) on the second side of the plane (P) of the pallet (100), a distance between the first part (151) of the secondary foot arrangement (150) and the front end ($F_{100}$) is at most 20% of the length ($L_{100}$) of the pallet (100), the second part (152) of the secondary foot arrangement (150) protrudes in the direction of normal of the plane (P) of the pallet (100) on the second side of the plane (P) of the pallet (100), and a distance between the second part (152) of the secondary foot arrangement (150) and the front end ($F_{100}$) is from 30% to 70% of the length ($L_{100}$) of the pallet (100), wherein the rod (102) has a length ($L_{102}$), and a span of the rod (102) is at least half of the length ($L_{102}$) of the rod.

102. The pallet (100) of example 101, wherein the rod (102) has a circular cross section, which may be hollow or integral and/or the rod (102) is rotatable relative to the frame (110) about an axis that is parallel to the length ($L_{102}$) of the rod (102).

103. The pallet (100) of example 101 or 102, wherein the rod (102) has a span of at least 400 mm.

104. The pallet (100) of any of the examples 101 to 103, comprising
- a primary side profile (132) at the primary side part (112) of the pallet (100) and
- a secondary side profile (133) at the secondary side part (113) of the pallet (100), wherein
- from the front end ($F_{100}$), the primary side profile (132) and the secondary side profile (133) run in the same direction towards a rear end ($R_{100}$) of the pallet (100) for a distance that is at least a half of the length of the pallet ($L_{100}$);
- preferably,
- the primary side profile (132) and the secondary side profile (133) run in parallel throughout their lengths.

105. The pallet (100) of any of the examples 101 to 104, wherein
- the second part (142) of the primary foot arrangement (140) forms a primary slot (143) that opens towards the secondary side part (113), whereby the primary (143) slot is configured to receive a part of a first side beam (202) of a bed (200) of a transport device (400) and
- the second part (152) of the secondary foot arrangement (150) forms a secondary slot (153) that opens towards the primary side part (112), whereby the secondary slot is configured to receive a part of a second side beam (203) of a bed (200) of a transport device (400).

106. The pallet (100) of any of the examples 101 to 105, comprising
- a second rod (104) that extends from the primary side part (112) to the secondary side part (113), wherein
- a distance between the second rod (104) and a rear end ($R_{100}$) of the pallet (100) is at most one fourth of the length ($L_{100}$) of the pallet (100),
- a span of the second rod (104) is at least half of the length of the second rod (104),
- the primary foot arrangement (140) comprises a third part (144), the third part (144) of the primary foot arrangement (140) protrudes from the primary side part (112) in the direction of normal of the plane (P) of the pallet (100) on the second side of the plane (P) of the pallet 100, and a distance between the third part (144) of the primary foot arrangement (140) and the rear end ($R_{100}$) is at most 20% of the length ($L_{100}$) of the pallet 100, and
- the secondary foot arrangement (150) comprises a third part (154), the third part (154) of the secondary foot arrangement (150) protrudes from the secondary side part (113) in the direction of normal of the plane (P) of the pallet (100) on the second side of the plane (P) of the pallet 100, and a distance between the third part (154) of the secondary foot arrangement (150) and the rear end ($R_{100}$) is at most 20% of the length ($L_{100}$) of the pallet 100.

107. The pallet (100) of any of the examples 101 to 106, comprising
- a primary articulation (113) arranged such that at least one of the first part (141) and the second part (142) of the primary foot arrangement (140) is pivotable relative to the plane (P) of the pallet (100) about an axis that is unidirectional with a length ($L_{100}$) of the pallet (100) and/or
- a secondary articulation arranged such that at least one of the first part (151) and the second part (152) of the secondary foot arrangement (150) is pivotable relative to the plane (P) of the pallet (100) about an axis that is unidirectional with a length ($L_{100}$) of the pallet (100); preferably the pallet comprises
- a primary spring (115) configured to turn at least one of the first part (141) and the second part (142) of the primary foot arrangement (140) towards such a position in which the at least one of the first part (141) and the second part (142) of the primary foot arrangement protrudes from the primary side part (112) in the direction of normal of the plane of the pallet (100) on the second side of the plane of the pallet (100) and
- a secondary spring configured to turn at least one of the first part (151) and the second part (152) of the secondary foot arrangement (150) towards such a position in which the at least one of the first part (151) and the second part (152) of the secondary foot arrangement (150) protrudes from the secondary side part (113) in the direction of normal of the plane of the pallet (100) on the second side of the plane of the pallet (100).

108. The pallet (100) of any of the examples 101 to 107, comprising
- wheels (120, 121, 120b, 121b) arranged on the second side of the plane (P) of the pallet (100) and configured to contact a base (BASE), such as a floor or a road, when the pallet (100) is arranged on the base (BASE); preferably
- at least one of the wheels (120, 121) is rotatable about an axis that is unidirectional with a normal of the plane (P) of the pallet (100).

109. The pallet (100) of the example 108, comprising
- a primary front wheel (120) arranged at the primary side part (112) and at the front end ($F_{100}$) of the pallet (100) and
- a secondary front wheel (102b) arranged at the secondary side part (113) and at the front end ($F_{100}$) of the pallet (100), wherein
- neither the primary front wheel (120) nor the secondary front wheel (102b) is arranged in between the first part (141) of the primary foot arrangement (140) and the first part (151) of the secondary foot arrangement (150); preferably
- the primary front wheel (120) and the secondary front wheel (120b) are rotatable about an axis that is unidirectional with the normal of the plane (P) of the pallet (100).

110. The pallet (100) of the example 108 or 109, comprising
- a primary rear wheel (121) arranged at the primary side part (112) and at the rear end ($R_{100}$) of the pallet (100) and
- a secondary rear wheel (121b) arranged at the secondary side part (113) and at the rear end ($R_{100}$) of the pallet (100); preferably,
- the primary rear wheel (121) and the secondary rear (121b) wheel are rotatable about an axis that is unidirectional with the normal of the plane (P) of the pallet (100).

111. The pallet (100) of any of the examples 108 to 110, comprising
- a brake (126) that is configured to be in an open position and a closed position, wherein
- in the closed position, the brake (126) is configured to retard or prevent rotation of at least one of the wheels (120, 121, 120b, 121b) of the pallet (100) and
- in the open position, the wheels (120, 121, 120b, 121b) are configured to rotate freely.

112. The pallet (100) of the example 111, comprising
- a brake handle (127) which can be used to turn the brake (126) from the open position to the closed position and from the closed position to the open position.

113. The pallet (100) of the example 111 or 112, wherein the brake (126) is configured to turn from the closed to the open position, when the front end ($F_{100}$) of the pallet is lifted.

114. The pallet (100) of any of the examples 101 to 113, comprising
a handle (106) for manually handling the pallet (100); preferably,
the handle (106) is arranged on the first side of the plane (P) of the pallet (100) and
a distance between the handle (106) and the plane (P) of the pallet (100) is at least 50 cm.

115. The pallet (100) of any of the examples 101 to 114, wherein
the frame (110) provided with at least a roll that protrudes on the second side of the plane (P) of the pallet (100), wherein the roll is configured to contact a side beam of a bed (200) of a transport device (400).

116. The pallet of any of the examples 101 to 115, comprising
a microchip configured to detect a location of the pallet (100).

117. The pallet of any of the examples 101 to 116, comprising
equipment for radio frequency identification.

118. The pallet of any of the examples 101 to 117, comprising
a radio frequency communication circuit and
an energy source configured to provide electricity to the radio frequency communication circuit.

119. The pallet of any of the examples 101 to 118, comprising
a middle rod (105) that extends from the primary side part (112) to the secondary side part (113), wherein
a distance between the middle rod (105) and the front end ($F_{100}$) of the pallet (100) is from one third to two thirds of the length ($L_{100}$) of the pallet (100).

120. The pallet of any of the examples 101 to 119, wherein
a distance of 50 mm to 150 mm, preferably from 90 mm to 110 mm, is configured to be left in between the rod (102) and a flat base (BASE), when the pallet (100) as arranged on the flat base (BASE).

201. A transport device (400), comprising
a chassis (300) comprising at least one axle (311, 312), which defines a plane of the chassis (300) and a direction of length ($DL_{300}$) for the chassis (300),
a bed (200) comprising
a first side beam (202) at a first side of the bed (200) and
a second side beam (203) at a second side of the bed (200), the second side of the bed (200) being opposite the first side of the bed (200), wherein the first side beam (202) and the second side beam (203) define a plane of the bed, wherein
the first side beam (202) and the second side beam (203) define a front end ($F_{200}$) of the bed (200) and a rear end ($R_{200}$) of the bed (200), the front end ($F_{200}$) of the bed and the rear end ($R_{200}$) the bed being arranged a length of the bed ($L_{200}$) apart from each other,
from the front end ($F_{200}$), the first side beam (202) and the second side beam (203) run in the same direction towards the rear end ($R_{200}$) for a distance that is at least a half of the length of the bed ($L_{200}$), and
from the rear end ($R_{200}$), the first side beam (202) and the second side beam (203) run in such a way that a distance between the first side beam (202) and the second side beam (203) increases towards the front end ($F_{200}$), the transport device (400) comprising
a first articulation (241) for turning the bed (200) relative to the chassis (300) about an axle that is unidirectional with a normal of the plane of the bed (200) or unidirectional with a normal of the plane of the chassis (300),
a second articulation (242) for turning the bed (200) relative to the chassis (300) about an axis that is unidirectional with a width of the bed (200) or unidirectional with a width of the chassis (300), and
a loading and unloading arrangement (206) for loading a pallet (100) onto the bed (200) from the rear end ($R_{200}$) and for unloading a pallet (100) from the bed (200).

202. The transport device (400) of example 201, wherein
the bed (200) has a first width ($W_{1200}$) at the front end ($F_{200}$) and a second width ($W_{2200}$) at the rear end ($R_{200}$), wherein
the second width ($W_{2200}$) is at least one third smaller than the first width ($W_{1200}$);
preferably
an angle ($\alpha$) between the longitudinal directions of the first side beam (202) and the second side beam (203) at a rear part of the bed (200) is from 15 to 120 degrees.

203. The transport device (400) of example 201 or 202, wherein
the first side beam (202) runs from the front end ($F_{200}$) in parallel with the second side beam (203) towards the rear end ($R_{200}$) up to a first bend point (232),
the second side beam (203) runs from the front end ($F_{200}$) in parallel with the first side beam (202) towards the rear end ($R_{200}$) up to a second bend point (233),
the first side beam (202) has a constant height at least from the first bend point (232) towards front end ($F_{200}$) for a distance of at least 10 cm and
the second side beam (203) has a constant height at least from the second bend point (233) towards front end ($F_{200}$) for a distance of at least 10 cm, wherein
the height is unidirectional with a normal of the plane of the bed (200).

204. The transport device (400) of any of the examples 201 to 203, wherein
the first side beam (202) and the second side beam (203) are provided with at least a roll, which is configured to contact a frame (110) of a pallet (100) when loading a pallet (100) onto the bed (200).

205. The transport device (400) of any of the examples 201 to 204, comprising
a third articulation (243) for turning the bed (200) relative to the chassis (300) about an axis that is unidirectional with the direction of length ($L_{200}$) for the bed (200) or that is unidirectional with a direction ($DL_{300}$) of length for the chassis (300).

206. The transport device (400) of example 205, comprising
a ball joint, which forms the first articulation (241), the second articulation (242), and the third articulation (243).

207. The transport device (400) of any of the examples 201 to 205, comprising
a universal joint, which forms the first articulation (241) and the second articulation (242).

208. The transport device (400) of any of the examples 201 to 207, wherein the loading and unloading arrangement comprises

[A]
a loading device for loading a pallet (100) onto the bed (200) from the rear end ($R_{200}$) and
an unloading device for unloading a pallet (100) from the bed (200) or

[B]
only one loading and unloading device for loading a pallet (100) onto the bed (200) from the rear end ($R_{200}$) and for unloading a pallet (100) from the bed (200).

209. The transport device (400) of any of the examples 201 to 208, wherein
the bed (200) is movable relative to the chassis (300) by translation.

210. The transport device (400) of any of the examples 201 to 209, comprising
a sliding means, such as a wheel (207), arranged at the rear end ($R_{200}$) of the bed (200) or at an ultimate rear end ($R_{200U}$) of the bed (200), wherein
the sliding means is configured to contact a base, such as a floor or a road, at least when starting to load a pallet (100).

211. The transport device (400) of any of the examples 201 to 210, comprising
a first sensor configured to detect at least one of
an angle between the plane of the bed (200) and the plane of the chassis (300),
a distance between a centre of the bed (200) and a centre of the chassis (300), and
a position of a pallet (100) arranged on the bed (200).

212. The transport device (400) of any of the examples 201 to 211, wherein the loading and unloading arrangement (206) comprises
a carrier (210) configured to move in between the front end ($F_{200}$) and the rear end ($R_{200}$) or an ultimate rear end ($R_{200U}$) of the bed (200) in the direction of length of the bed (200) and
means for moving the carrier (210);
preferably
the means for moving the carrier (210) comprises a motor configured to move the carrier (210).

213. The transport device (400) of the example 212, comprising
a rear roll (224) arranged at the rear end ($R_{200}$) of the bed (200) or at the ultimate rear end ($R_{200U}$) of the bed (200),
a front roll (222) arranged at the front end ($F_{200}$) of the bed (200), and
a rope or a cable (220), wherein
one end of the rope or the cable (220) is fixed to the chassis (300) and the other end of the of the rope or the cable (220) is fixed to the carrier (210), and
the rope or cable (220) runs in between the ends thereof such that it goes round the rear roll (224) and the front roll (222).

214. The transport device (400) of the example 212 or 213,
an openable and closable hook (211) fixed to the carrier (210).

215. The transport device (400) of the example 214, wherein
the hook (211) is configured to be fixed to a rod (102) of pallet (100) in an openable manner, the hook (211) is configured to be in an open position when the carrier (210) is at the rear end ($R_{200}$) or at the ultimate rear end ($R_{200U}$), and
the hook (211) is configured to be in a closed position when the carrier (210) is at the front end ($F_{200}$.

216. The transport device (400) of any of the examples 212 or 215, wherein
the means for moving the carrier (210) is configured to rotate a screw (218), and
the carrier (210) is configured to move towards the ultimate rear end ($R_{200U}$) when the screw (218) rotates in a first direction and
the carrier (210) is configured to move towards the front end ($F_{200}$) when the screw (218) rotates in a second direction that is opposite to the first direction.

217. The transport device (400) of the examples 212 to 215, wherein
the means for moving the carrier (210) is configured to rotate a gear wheel,
the gear wheel is configured to engage a chain loop, and
the carrier (210) is configured move with the chain loop.

218. The transport device (400) of any of the examples 212 to 217, comprising
an opening and closing means (212) that is configured to
move the hook (211) from the open position to the closed position, when the carrier (210) moves from the rear end ($R_{200}$) or the ultimate rear end ($R_{200U}$) to the from end ($F_{200}$) and
move the hook (211) from the closed position to the open position when the carrier (210) moves from the front end ($F_{200}$) to the rear end ($R_{200}$) or the ultimate rear end ($R_{200U}$).

219. The transport device (400) of any of the examples 212 to 218, wherein
the loading and unloading arrangement (206) is configured to stop a motor of the means for moving the carrier (210) from running when the carrier (210) reaches a predefined position.

220. The transport device (400) any of the examples 201 to 219, comprising
a microchip configured to detect a location of the transport device (400).

221. The transport device (400) of any of the examples 201 to 220, comprising
a radio frequency communication circuit and
an energy source configured to provide electricity to the radio frequency communication circuit.

222. The transport device of any of the examples 201 to 221, wherein
the chassis (300) comprises at least two axles (311, 312), which define the plane of the chassis (300) and the direction of length ($DL_{300}$) for the chassis (300) and/or
the chassis (300) comprises a beam for pulling the chassis (300), whereby beam defines the direction of length ($DL_{300}$) for the chassis (300), and the beam and the axle (311) in combination define the plane of the chassis.

223. The transport device (400) of any of the examples 201 to 222, wherein
the a loading and unloading arrangement (206) is configured to grab such a rod (102) of a pallet (100) that is arranged a distance of 50 mm to 150 mm, preferably from 90 mm to 110 mm, from a flat base (BASE), when the transport device is on the flat base (BASE).

301. A system for transporting goods, the system comprising
a pallet (100) according to any of the examples 101 to 120 and a transport device (400) according to any of the examples 201 to 223.

302. The system of example 301, wherein
the loading and unloading arrangement (206) is configured to load the pallet (100) onto the bed (200) from the rear end (R$_{200}$) of the bed (200) by pulling the pallet (100) from the rod (102).

303. The system of example 301 or 302, wherein
a distance between the primary foot arrangement (140) of the pallet (100) and the secondary foot arrangement (150) of the pallet (100) is at least equal to and at most 20 mm greater than a distance between an outer edge of the first side beam (202) of the bed (200) and an outer edge of the second side beam (203) at the front end (F$_{200}$) of the bed (200).

304. The system of any of the examples 301 to 303, wherein
a height of the primary slot (143) of the pallet (100) is at least equal to and at most 25 mm greater than a height of the first side beam (202) of the bed (200) and
a height of the secondary slot (153) of the pallet (100) is at least equal to and at most 25 mm greater than a height of the second side beam (203) of the bed (200).

305. The system of any of the examples 301 to 304, wherein
at least a part of the primary side part (112) of the pallet (100) is configured to be on the first side beam (202) of the bed (200), when the pallet (100) is loaded onto the bed (200) and
at least a part of the secondary side part (113) of the pallet (100) is configured to be on the second side beam (203) of the bed (200), when the pallet (100) is loaded onto the bed (200).

306. The system of any of the examples 301 to 305, wherein
the pallet (100) comprises a microchip configured to detect a location of the pallet (100) and
the transport device (400) comprises microchip configured to detect a location of the transport device (400).

307. The system of any of the examples 301 to 306, wherein
the pallet (100) comprises
a radio frequency communication circuit and
an energy source configured to provide electricity to the radio frequency communication circuit, and
the transport device (400) comprises
a radio frequency communication circuit and
an energy source configured to provide electricity to the radio frequency communication circuit.

308. The system of any of the examples 301 to 307, wherein
a distance (d$_G$) is configured to be left in between the rod (102) of the pallet (100) and a flat base (BASE), when the pallet (100) as arranged on the flat base (BASE), and
the loading and unloading arrangement (206) of the transport device (400) is configured to grab the rod (102) of a pallet (100), which is arranged the distance (d$_G$) from the flat base (BASE), when the transport device (400) is on the flat base (BASE).

309. The system of the example 308, wherein
the distance (d$_G$) is from 50 mm to 150 mm, preferably from 90 mm to 110 mm.

The invention claimed is:
1. A pallet, comprising:
a frame having a primary side part and secondary side part, which is opposite to the primary side part, the frame defining a front end of the pallet, a rear end of the pallet, and a plane of the pallet such that the pallet is configured to receive goods on a first side of the plane of the pallet,
a rod that extends from the primary side part to the secondary side part, wherein a distance between the rod and the front end is at most one fourth of the length of the pallet,
a primary foot arrangement at the primary side part, the primary foot arrangement comprising a first part of the primary foot arrangement and a second part of the primary foot arrangement, wherein
the first part of the primary foot arrangement protrudes in the direction of normal of the plane of the pallet on a second side of the plane of the pallet, which second side of the plane of the pallet is opposite to the first side of the plane of the pallet,
a distance between the first part of the primary foot arrangement and the front end is at most 20% of a length of the pallet, wherein the length of the pallet extends from the front end to the rear end,
the second part of the primary foot arrangement protrudes in the direction of normal of the plane of the pallet on the second side of the plane of the pallet, and
a distance between the second part of the primary foot arrangement and the front end is from 30% to 70% of the length of the pallet and
a secondary foot arrangement at the secondary side part, the secondary foot arrangement comprising a first part of the secondary foot arrangement and a second part of the secondary foot arrangement, wherein
the first part of the secondary foot arrangement protrudes in the direction of normal of the plane of the pallet on the second side of the plane of the pallet,
a distance between the first part of the secondary foot arrangement and the front end is at most 20% of the length of the pallet,
the second part of the secondary foot arrangement protrudes in the direction of normal of the plane of the pallet on the second side of the plane of the pallet, and
a distance between the second part of the secondary foot arrangement and the front end is from 30% to 70% of the length of the pallet, wherein
the rod has a length,
a span of the rod is at least half of the length of the rod, and
an object that encircles the rod can be freely moved in the direction of length of the rod for the span, whereby
when loading the pallet by pulling from the rod, a grabbing means is movable relative to the rod in the direction of the rod.

2. The pallet of claim 1, wherein
the rod has a span of at least 400 mm.

3. The pallet of the claim 1, comprising
a middle rod that extends from the primary side part to the secondary side part, wherein
a distance between the middle rod and the front end of the pallet is from one third to two thirds of the length of the pallet.

4. The pallet of claim 1, wherein
the second part of the primary foot arrangement forms a primary slot that opens towards the secondary side part, whereby the primary slot is configured to receive a part of a first side beam of a bed of a transport device and the second part of the secondary foot arrangement forms a secondary slot that opens towards the primary side part, whereby the secondary slot is configured to receive a part of a second side beam of a bed of a transport device.

5. The pallet of claim 1, comprising
wheels arranged on the second side of the plane of the pallet and configured to contact a base when the pallet is arranged on the base.

6. The pallet of the claim 5, comprising
a brake that is configured to be in an open position and a closed position, wherein
in the closed position, the brake is configured to retard or prevent rotation of at least one of the wheels of the pallet and
in the open position, the wheels are configured to rotate freely.

7. The pallet of the claim 6, wherein
the brake is configured to turn from the closed to the open position when the front end of the pallet is lifted.

8. A transport device, comprising
a chassis comprising at least one axle, which defines a plane of the chassis and a direction of length for the chassis,
a bed comprising
  a first side beam at a first side of the bed and
  a second side beam at a second side of the bed, the second side of the bed being opposite the first side of the bed, wherein the first side beam and the second side beam define a plane of the bed, wherein
the first side beam and the second side beam define a front end of the bed and a rear end of the bed, the front end of the bed and the rear end the bed being arranged a length of the bed apart from each other,
from the front end, the first side beam and the second side beam run in the same direction towards the rear end for a distance that is at least a half of the length of the bed, and
from the rear end, the first side beam and the second side beam run in such a way that a distance between the first side beam and the second side beam increases towards the front end, the transport device comprising
a first articulation for turning the bed relative to the chassis about an axle that is unidirectional with a normal of the plane of the bed or unidirectional with a normal of the plane of the chassis,
a second articulation for turning the bed relative to the chassis about an axis that is unidirectional with a width of the bed or unidirectional with a width of the chassis,
a third articulation for turning the bed relative to the chassis about an axis that is unidirectional with the direction of length for the bed or that is unidirectional with a direction of length for the chassis, and
a loading and unloading arrangement for loading a pallet onto the bed from the rear end and for unloading a pallet from the bed.

9. The transport device of the claim 8, wherein
the bed has a first width at the front end and a second width at the rear end, wherein
the second width is at least one third smaller than the first width.

10. The transport device of the claim 9, wherein
an angle between the longitudinal directions of the first side beam and the second side beam at a rear part of the bed is from 15 to 120 degrees.

11. The transport device of the claim 8, wherein
the bed is movable relative to the chassis by translation.

12. The transport device of claim 8, comprising
a sliding means arranged at the rear end of the bed or at an ultimate rear end of the bed, wherein
the sliding means is configured to contact a base at least when starting to load a pallet.

13. The transport device of claim 8, wherein the loading and unloading arrangement comprises
a carrier configured to move in between the front end and the rear end or an ultimate rear end of the bed in the direction of length of the bed and
means for moving the carrier.

14. The transport device of the claim 13, comprising
a rear roll arranged at the rear end of the bed or at the ultimate rear end of the bed,
a front roll arranged at the front end of the bed, and
a rope or a cable, wherein
one end of the rope or the cable is fixed to the chassis and the other end of the of the rope or the cable is fixed to the carrier, and
the rope or cable runs in between the ends thereof such that it goes round the rear roll and the front roll.

15. The transport device of claim 8, wherein
the loading and unloading arrangement is configured to grab such a rod of a pallet that is arranged a distance of 50 mm to 150 mm from a flat base, when the transport device is on the flat base.

16. A system for transporting goods, the system comprising:
a pallet comprising
a frame having a primary side part and secondary side part, which is opposite to the primary side part, the frame defining a front end of the pallet, a rear end of the pallet, and a plane of the pallet such that the pallet is configured to receive goods on a first side of the plane of the pallet, a rod that extends from the primary side part to the secondary side part, wherein a distance between the rod and the front end is at most one fourth of a length of the pallet, wherein the length of the pallet extends from the front end to the rear end,
a primary foot arrangement at the primary side part, the primary foot arrangement comprising a first part of the primary foot arrangement and a second part of the primary foot arrangement, wherein
  the first part of the primary foot arrangement protrudes in the direction of normal of the plane of the pallet on a second side of the plane of the pallet, which second side of the plane of the pallet is opposite to the first side of the plane of the pallet,
  a distance between the first part of the primary foot arrangement and the front end is at most 20% of the length of the pallet,
  the second part of the primary foot arrangement protrudes in the direction of normal of the plane of the pallet on the second side of the plane of the pallet, and
  a distance between the second part of the primary foot arrangement and the front end is from 30% to 70% of the length of the pallet and
a secondary foot arrangement at the secondary side part, the secondary foot arrangement comprising a first part of the secondary foot arrangement and a second part of the secondary foot arrangement, wherein
  the first part of the secondary foot arrangement protrudes in the direction of normal of the plane of the pallet on the second side of the plane of the pallet, a distance between the first part of the secondary foot arrangement and the front end is at most 20% of the length of the pallet, the second part of the secondary foot arrangement protrudes in the direction of normal of the plane of the pallet on the second side of the plane of the pallet, and a distance between the second part of the secondary foot arrangement and the front end is from 30% to 70% of the length of the pallet, wherein the rod has a length, a span of the rod is at least half of the length of the rod, and an object that encircles the rod can be freely moved in the direction of length of the rod for the span, whereby when loading the pallet by pulling from the rod, a grabbing means is movable relative to the rod in the direction of the rod; and a transport device comprising a chassis comprising at least one axle, which defines a plane of the chassis and a direction of length for the chassis, a bed comprising a first side beam at a first side of the bed and a second side beam at a second side of the bed, the second side of the bed being opposite the first side of the bed, wherein the first side beam and the second side beam define a plane of the bed, wherein the first side beam and the second side beam define a front end of the bed and a rear end of the bed, the front end of the bed and the rear end the bed being arranged a length of the bed apart from each other, from the front end, the first side beam and the second side beam run in the same direction towards the rear end for a distance that is at least a half of the length of the bed, and from the rear end, the first side beam and the second side beam run in such a way that a distance between the first side beam and the second side beam increases towards the front end, the transport device comprising a first articulation for turning the bed relative to the chassis about an axle that is unidirectional with a normal of the plane of the bed or unidirectional with a normal of the plane of the chassis, a second articulation for turning the bed relative to the chassis about an axis that is unidirectional with a width of the bed or unidirectional with a width of the chassis, a third articulation for turning the bed relative to the chassis about an axis that is unidirectional with the direction of length for the bed or that is unidirectional with a direction of length for the chassis, and a loading and unloading arrangement for loading a pallet onto the bed from the rear end and for unloading a pallet from the bed.

* * * * *